(12) United States Patent
Matsumi

(10) Patent No.: US 10,021,273 B2
(45) Date of Patent: Jul. 10, 2018

(54) IMAGE READING DEVICE PROVIDED WITH READER HAVING LENS ARRAY AND LIGHT RECEIVING ELEMENTS AND CORRECTING OUTPUT BASED ON EVALUATION OF REFERENCE MEMBER READINGS

(71) Applicant: BROTHER KOGYO KABUSHIKI KAISHA, Nagoya, Aichi (JP)

(72) Inventor: Takashi Matsumi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/427,181

(22) Filed: Feb. 8, 2017

(65) Prior Publication Data

US 2017/0237878 A1 Aug. 17, 2017

(30) Foreign Application Priority Data

Feb. 17, 2016 (JP) ................................ 2016-027701

(51) Int. Cl.
*H04N 1/401* (2006.01)
*H04N 1/407* (2006.01)
(Continued)

(52) U.S. Cl.
CPC ....... *H04N 1/4097* (2013.01); *H04N 1/00013* (2013.01); *H04N 1/00045* (2013.01);
(Continued)

(58) Field of Classification Search
None
See application file for complete search history.

(56) References Cited

U.S. PATENT DOCUMENTS 8,405,887 B2 * 3/2013 Oumi ................. H04N 1/00002
358/461
8,730,528 B2 * 5/2014 Sakai ..................... H04N 1/401
358/461
(Continued)

FOREIGN PATENT DOCUMENTS

JP 5131056 B2 1/2013
JP 2013-157922 A 8/2013

*Primary Examiner* — Scott A Rogers
(74) *Attorney, Agent, or Firm* — Scully, Scott, Murphy & Presser, PC

(57) ABSTRACT

In an image reading device, a controller is configured to perform: calculating a ratio between first and second reference data as evaluation data; designating a target light receiving element from a plurality of light receiving elements one by one sequentially; calculating average evaluation data of the target light receiving element by averaging the evaluation data of a second number of light receiving elements located at positions apart every predetermined distance equal to a length of a first number of consecutively arranged light receiving elements; setting an evaluation range of the target light receiving element by adding/subtracting a predetermined value to/from the average evaluation data; determining whether the evaluation data falls within the evaluation range; in response to determining that the evaluation data is out of the evaluation range, revising the second reference data of the target light receiving element; and generating correction data using the second reference data after revision.

10 Claims, 13 Drawing Sheets

(51) Int. Cl.
  *H04N 1/409* (2006.01)
  *H04N 1/193* (2006.01)
  *H04N 1/031* (2006.01)
  *H04N 1/028* (2006.01)
  *H04N 1/00* (2006.01)

(52) U.S. Cl.
  CPC ..... *H04N 1/00068* (2013.01); *H04N 1/00909* (2013.01); *H04N 1/02845* (2013.01); *H04N 1/0312* (2013.01); *H04N 1/0318* (2013.01); *H04N 1/193* (2013.01); *H04N 1/401* (2013.01); *H04N 1/4078* (2013.01); *H04N 2201/0081* (2013.01)

(56) References Cited

U.S. PATENT DOCUMENTS

| | | | |
|---|---|---|---|
| 2011/0181921 A1* | 7/2011 | Fukutome | G03G 15/50 358/474 |
| 2013/0194638 A1 | 8/2013 | Kuno et al. | |
| 2013/0250378 A1* | 9/2013 | Kitai | H04N 1/00023 358/504 |
| 2016/0134781 A1* | 5/2016 | Kato | H04N 1/4076 358/521 |
| 2017/0034364 A1* | 2/2017 | Matsumi | H04N 1/00087 |

* cited by examiner

IMAGE READING DEVICE PROVIDED WITH READER HAVING LENS ARRAY AND LIGHT RECEIVING ELEMENTS AND CORRECTING OUTPUT BASED ON EVALUATION OF REFERENCE MEMBER READINGS

CROSS REFERENCE TO RELATED APPLICATION

This application claims priority from Japanese Patent Application No. 2016-027701 filed on Feb. 17, 2016. The entire content of the priority application is incorporated herein by reference.

TECHNICAL FIELD

The present disclosure relates to an image reading device.

BACKGROUND

In general, there has been known an image reading device that reads a white reference plate to acquire white reference data, stores the acquired white reference data in a non-volatile memory, and performs shading compensation using the stored white reference data. In a contact image sensor provided with a rod lens array, so-called lens irregularity, in which the intensity of light condensed by photoelectric conversion elements is increased near the center of each single lens constituting the rod lens array and is reduced near the edge of each single lens, may occur. Further, in a contact image sensor, a light source, a rod lens array, a substrate on which photoelectric conversion elements are mounted, and the like are fixed to a housing in a predetermined positional relationship. Such arrangement may cause positional shifts between each of the photoelectric conversion elements and the rod lens array with an increase in temperature because they have different coefficients of thermal expansion and are fixed in different methods.

The image reading device described in Japanese Patent Publication No. 5,131,056 is provided with a reference plate, and reads an image of the reference plate to acquire reference plate data. The image reading device derives a ratio between the acquired reference plate data and white reference data stored in advance as a reference ratio of each pixel in one line worth. The image reading device regards a pixel whose reference ratio is out of a predetermined range as an affected pixel affected by a foreign matter such as paper dust, and corrects the reference plate data of the affected pixel to set new white reference data.

SUMMARY

The conventional image reading device described above determines whether each pixel is affected by a foreign matter by determining whether its reference ratio between the reference plate data and the white reference data falls within the predetermined range. A situation described below occurs in connection with the reference ratio. Normally, a white acquisition temperature measured when the white reference data is acquired is different from a reference acquisition temperature measured when the reference plate data is acquired. For this reason, a temperature change from the white acquisition temperature to the reference acquisition temperature causes the positional shifts between each photoelectric conversion element and the rod lens array as described above. When such positional shifts occur, positions of irregularities in one line are shifted between lens irregularities occurred in each photoelectric conversion element at the time when the white reference data is acquired and lens irregularities occurred in each photoelectric conversion element at the time when the reference plate data is acquired. Due to the positional shifts of the lens irregularities, positions of irregularities that take place on the photoelectric conversion elements in one line become different from each other between the reference plate data and the white reference data. Accordingly, variations resulting from the positional shifts of the lens irregularities are generated in the reference ratios between the reference plate data and the white reference data. Further, when a reference plate to which a foreign matter such as paper dust is adhered is read, fluctuation due to the foreign matter occurs in the output of the reference plate data. As a result, variations resulting from the foreign matter are generated in the reference ratios.

This gives rise to a problem as to how to identify a specific one of the causes of the variations in reference ratios from among a foreign matter, positional shifts of lens irregularities, and both.

In view of the foregoing, it is an object of the disclosure to provide an image reading device capable of determining whether a pixel is affected by a foreign matter adhered to a reference plate even when reference data is stored in a non-volatile memory in advance.

In order to attain the above and other objects, the present disclosure provides an image reading device that includes: a reader; a reference member; and a controller. The reader includes: a light source; a plurality of light receiving elements; and a lens array. The light source is configured to emit light. The plurality of light receiving elements is arranged at an equi-interval on a line extending in a predetermined direction and consecutively arranged from a first light receiving element to a last light receiving element in the predetermined direction. The lens array has a plurality of lenses arranged at equi-interval on another line extending in the predetermined direction. The lens array is configured to direct light onto the plurality of light receiving elements. The plurality of light receiving elements outputs one line worth of data for setting values of a plurality of pixels. An interval between two adjacent lenses being equal to a length of an array of a first number of consecutively arranged light receiving elements. The reference member has an evenly colored surface. The controller is configured to perform: executing a first process; and executing a second process after execution of the first process. The first process includes reading the evenly colored surface of the reference member by the reader to acquire one line worth of first reference data from the plurality of light receiving elements. The second process includes: reading the evenly colored surface of the reference member by the reader to acquire one line worth of second reference data from the plurality of light receiving elements; calculating evaluation data with respect to each of the plurality of light receiving elements, the evaluation data being a ratio between the first reference data and the second reference data; designating a first target light receiving element from the plurality of light receiving elements one by one sequentially; calculating, each time the first target light receiving element is designated, average evaluation data by averaging the evaluation data of a second number of light receiving elements located at positions apart every predetermined distance equal to the length of the array of the first number of consecutively arranged light receiving elements, the second number of light receiving elements subject to an average evaluation data calculation being positionally associated with the designated first target light receiving element; setting an evaluation range of the designated first target light receiving element to have an upper limit and a lower limit, the upper limit of the evaluation range being set by adding a first value to the average evaluation data, the lower limit of the evaluation range being set by subtracting the first value from the average evaluation data; determining whether the evaluation data of the designated first target light receiving element falls within the evaluation range of the designated first target light receiving element; in response to determining that the evaluation data of the designated first target light receiving element is out of the evaluation range of the designated first target light receiving element, revising the second reference data of the designated first target light receiving element; and generating correction data for applying to an output from the designated first target light receiving element using the second reference data of the designated first target light receiving element after revision.

According to another aspect, the present disclosure provides an image reading device that includes: a reader; a reference member; a memory; and a controller. The reader includes: a light source; a plurality of light receiving elements; and lens array. The light source is configured to emit light toward an object. The plurality of light receiving elements is arranged at an equi-interval on a line extending in a predetermined direction and consecutively arranged from a first light receiving element to a last light receiving element in the predetermined direction. The lens array has a plurality of lenses arranged at an equi-interval on another line extending in the predetermined direction. The lens array is configured to receive light bearing an object image and form one line worth of the object image onto the plurality of light receiving elements. One line worth of object image data is outputted from the plurality of light receiving elements for setting values of a plurality of pixels. An interval between two adjacent lenses is equal to a length of an array of a prescribed number of consecutively arranged light receiving elements. The reference member has an evenly colored surface. The memory stores one line worth of first reference data obtained from the plurality of light receiving elements. The controller is configured to perform: reading the evenly colored surface of the reference member by the reader to acquire one line worth of second reference data from the plurality of light receiving elements; calculating evaluation data with respect to each of the plurality of light receiving elements, the evaluation data being a ratio between the first reference data and the second reference data; designating a target light receiving element from the plurality of light receiving elements one by one sequentially; calculating, each time the target light receiving element is designated, average evaluation data by averaging the evaluation data of a second number of light receiving elements located at positions apart every predetermined distance equal to the length of the array of the first number of consecutively arranged light receiving elements, the second number of light receiving elements subject to an average evaluation data calculation being positionally associated with the designated target light receiving element; setting an evaluation range of the designated target light receiving element to have an upper limit and a lower limit, the upper limit of the evaluation range being set by adding a predetermined value to the average evaluation data, the lower limit of the evaluation range being set by subtracting the predetermined value from the average evaluation data; determining whether the evaluation data of the designated target light receiving element falls within the evaluation range of the designated target light receiving element; in response to determining that the evaluation data of the designated target light receiving element is out of the evaluation range of the designated target light receiving element, revising the second reference data of the designated target light receiving element; generating correction data for applying to an output from the designated target light receiving element using the second reference data of the designated target light receiving element after revision; and correcting the one line worth of the object image data using the correction data after revision.

BRIEF DESCRIPTION OF THE DRAWINGS

The particular features and advantages of the disclosure as well as other objects will become apparent from the following description taken in connection with the accompanying drawings, in which.

DETAILED DESCRIPTION

Embodiment

Figure 1:
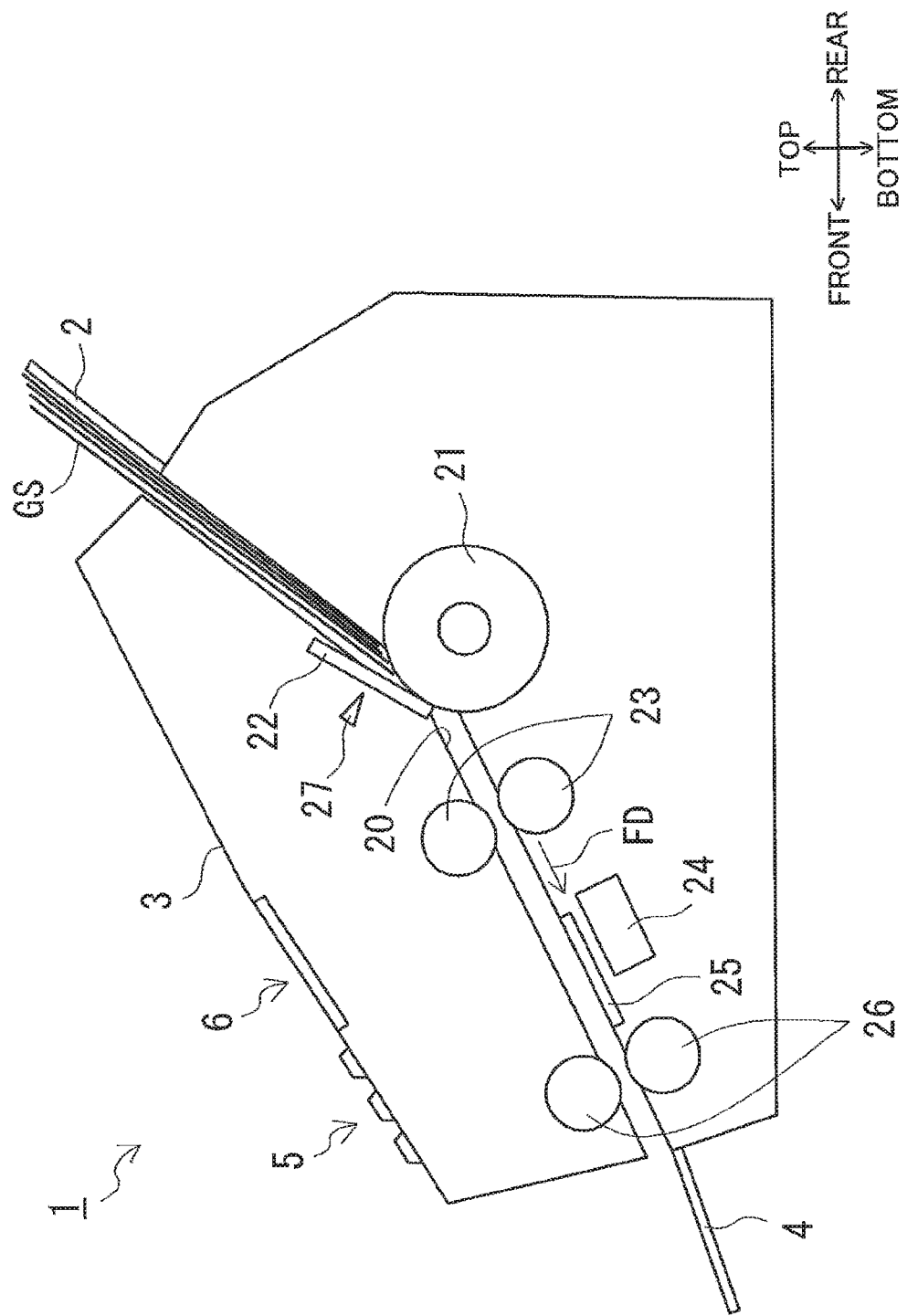
FIG. 1 is a central cross-sectional view of an image reading device according to one embodiment of the present disclosure.

An image reading device 1 according to one embodiment of the present disclosure will be described while referring to the accompanying drawings wherein like parts and components are designated by the same reference numerals to avoid duplicating description. Arrows in FIG. 1 indicate vertical and front-rear directions used in the following description in relation to the image reading device 1.

<Mechanical Configuration of the Image Reading Device 1>

As illustrated in FIG. 1, the image reading device 1 includes a feed tray 2, a body 3, and a discharge tray 4. An operating unit 5 and a display unit 6 are disposed on the top surface of the body 3. The operating unit 5 includes a power switch and various setting buttons including a set key, and receives an operation instruction from a user. For example, the operating unit 5 includes a start button for instructing the start of a reading operation, an operation button for setting a resolution. The display unit 6 includes a liquid crystal display (LCD), and displays a status of the image reading device 1.

A conveyance path 20 is formed in the interior of the body 3. An original sheet GS placed on the feed tray 2 is conveyed along the conveyance path 20 in a feeding direction, and discharged to the discharge tray 4. A sheet-feeding roller 21, a separation pad 22, a pair of upstream-side conveying rollers 23, a reading unit 24, a platen glass 25, and a pair of downstream-side conveying rollers 26 are disposed along the conveyance path 20.

The sheet-feeding roller 21 feeds the original sheets GS placed on the feed tray 2 one sheet at a time in cooperation with the separation pad 22. The upstream-side conveying rollers 23 and the downstream-side conveying rollers 26 are driven by a conveyance motor MT described later (see FIG. 4). The platen glass 25 has optical transparency, and is disposed along the underside of the conveyance path 20. The conveying rollers 23 and 26 convey the original sheet GS so that the original sheet GS fed by the sheet-feeding roller 21 passes on the platen glass 25.

In the present embodiment, the original sheet GS is placed on the feed tray 2 so that the reading surface of the original sheet GS confronts the placement surface of the feed tray 2. The reading unit 24 is disposed below the conveyance path 20, and reads an image of the reading surface of the original sheet GS that passes on the platen glass 25. An original sensor 27 is disposed on the feed tray 2. The original sensor 27 is configured to be turned on when original sheets GS are placed on the feed tray 2, and to be turned off when an original sheet GS is not placed on the feed tray 2.

(Detailed Configuration of the Reading Unit 24)

Figure 2:
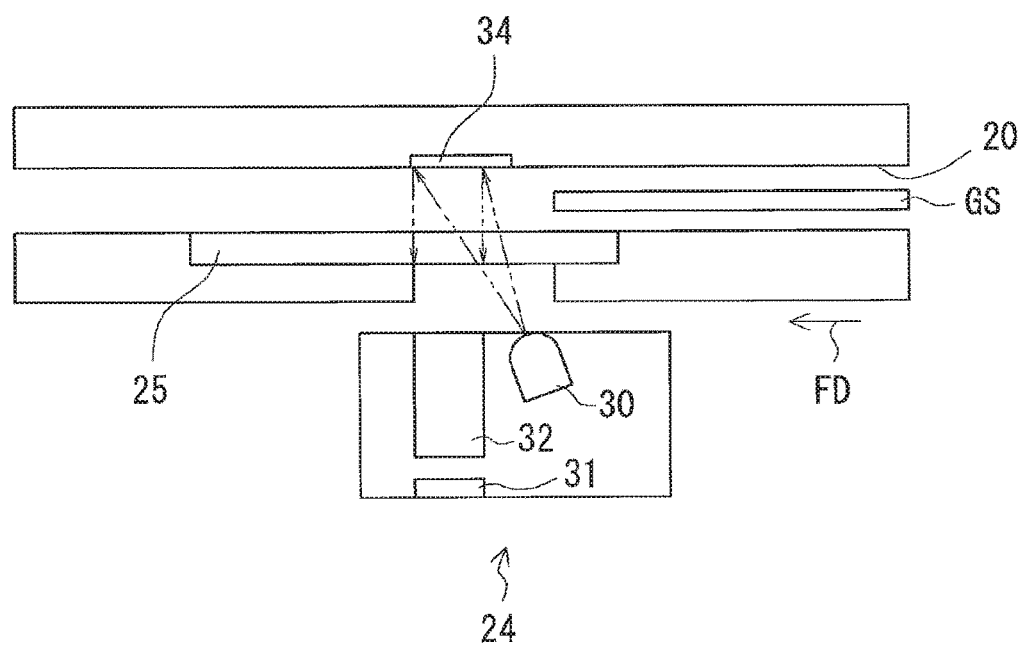
FIG. 2 is an enlarged view showing a structure of a reading unit in the image reading device.

The detailed configuration of the reading unit 24 will be described while referring to FIGS. 2 and 3. As illustrated in FIG. 2, the reading unit 24 includes a light source 30, a light receiving portion 31, and a rod lens array 32. The light source 30 includes light-emitting diodes in three colors of light red, green, and blue. When light emitted from the light source 30 is reflected off a reading surface of an original sheet GS, the rod lens array 32 forms an image of the reflected light onto the light receiving portion 31. In the present embodiment, when a color mode is selected, the light-emitting diodes in three colors are sequentially turned on, so that one line worth of an image of the original sheet GS is read. When a mono mode is selected, a light-emitting diode in one specific color of three colors, for example green, is turned on, so that one line worth of the image of the original sheet GS is read. In the present embodiment, the reading unit 24 is configured to be capable of reading 210 millimeters (mm) wide corresponding to the length of the short side of A4 size with a resolution of 300 dots per inch (DPI).

A gray reference plate 34 is disposed in a position confronting the reading unit 24 through the conveyance path 20. The gray reference plate 34 has an evenly colored gray surface having lower reflectivity than that of white which is a background color of the original sheet GS. When the original sheet GS is not present in the conveyance path 20, light emitted from the light source 30 is reflected off the surface of the gray reference plate 34, and the reflected light is received by the light receiving portion 31 through the rod lens array 32. The rod lens array 32 includes a plurality of rod lenses arranged at an equi-interval on a line extending in a main scanning direction MD. Each interval between adjacent rod lenses is 0.4 mm. A gray density of the surface of the gray reference plate 34 in the present embodiment is close to a black density. Even when the light source 30 is turned on with the maximum intensity of light, a reflection density of the surface of the gray reference plate 34 becomes lower than that of a white color.

Figure 3:
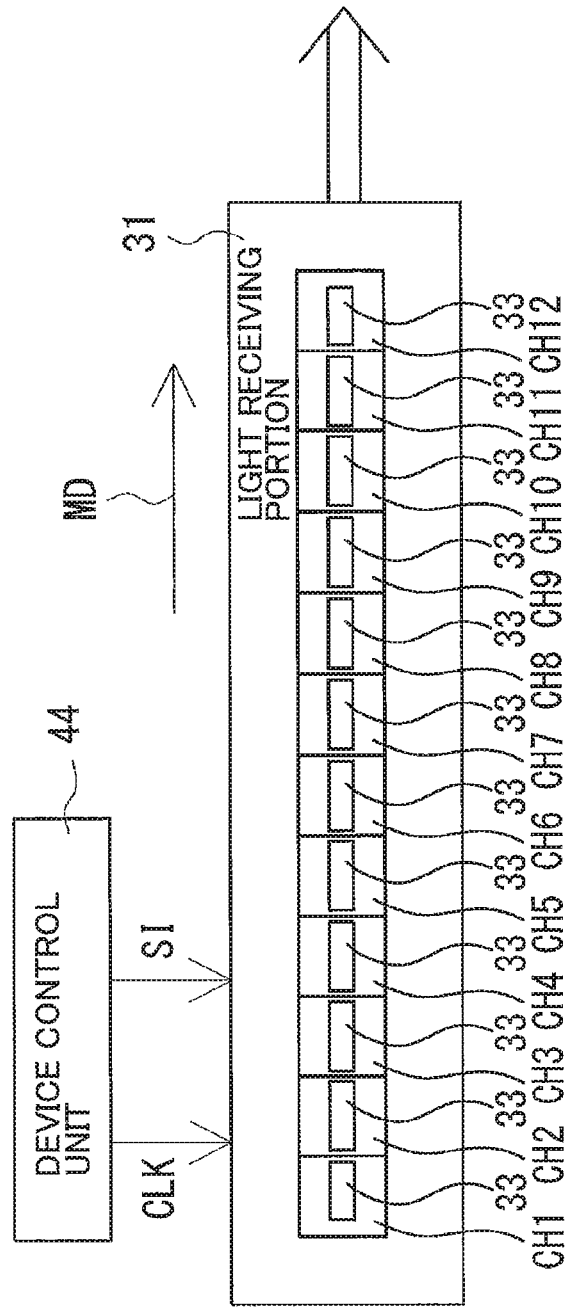
FIG. 3 is a block diagram showing a structure of a light receiving portion in the reading unit.

As illustrated in FIG. 3, the light receiving portion 31 includes twelve sensor integrated circuit (IC) chips CH1 through CH12 (hereinafter referred to as "chips CH1 through CH12") aligned linearly in the main scanning direction MD. More specifically, the chips CH1 through CH12 are aligned sequentially from the upstream side toward the downstream side of the main scanning direction MD. Each of the chips CH1 through CH12 includes a plurality of photoelectric conversion elements 33 aligned on one line extending in the main scanning direction MD, and has a built-in shift register (not shown) and a built-in amplifier (not shown). The plurality of photoelectric conversion elements 33 respectively corresponds to a plurality of pixels. That is, the plurality of pixels is arranged on one line extending in the main scanning direction MD. The intensity of light received by each photoelectric conversion element 33 is accumulated as electric charge, and the electric charge is outputted as an analog signal of each pixel. The first pixel is located in the chip CH1 which is located at the most upstream side of the main scanning direction MD among the chips CH1 through CH12. In the chip CH1, the first pixel is located at an end portion on the opposite side of the adjacent chip CH2. The last pixel is located in the chip CH12 which is located at the most downstream side of the main scanning direction MD among the chips CH1 through CH12. In the chip CH12, the last pixel is located at an end portion on the opposite side of the adjacent chip CH11. Each of the chips CH1 through CH12 includes 216 photoelectric conversion elements 33. Thus, the total number of the photoelectric conversion elements 33 is 2592. The pixel number PN assigned to the first pixel is 1, and the pixel number PN assigned to the last pixel is 2592. In the present embodiment, output characteristics of pixels in each of the chips CH1 through CH12 are the same; however, the output characteristics of pixels are different among the chips CH1 through CH12. One line includes a group of pixels from the first pixel to the last pixel, that is, 2592 pixels arranged on one line extending in the main scanning direction MD.

<Electrical Configuration of the Image Reading Device 1>

Figure 4:
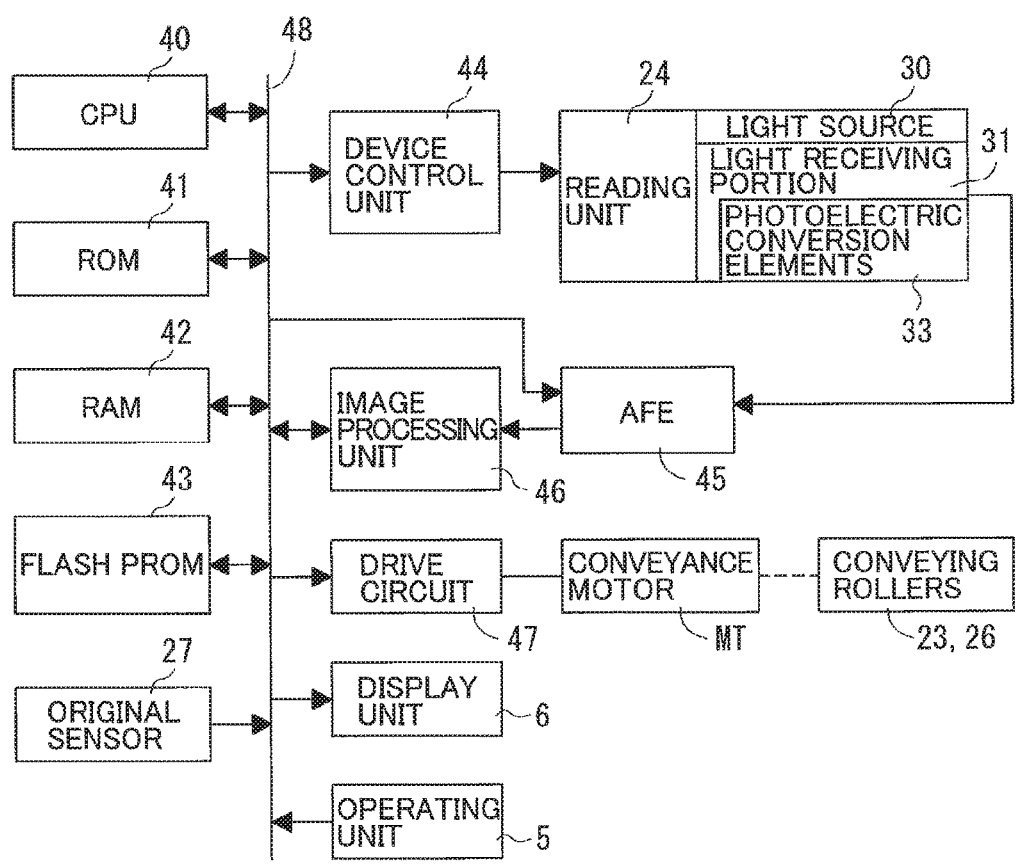
FIG. 4 is a block diagram showing an electrical configuration of the image reading device.

An electrical configuration of the image reading device 1 will be described while referring to FIG. 4. As illustrated in FIG. 4, the image reading device 1 includes, as main components, a central processing unit (CPU) 40, a read-only memory (ROM) 41, a random access memory (RAM) 42, a flash programmable read-only memory (flash PROM) 43, a device control unit 44, an analog front end (AFE) 45, an image processing unit 46, and a drive circuit 47. These components are connected via a bus 48 to the operating unit 5, the display unit 6, and the original sensor 27.

The ROM 41 stores programs for executing various operations of the image reading device 1, such as a main maintenance process, a main reading process, and various subroutine processes included in various main processes described later. The CPU 40 controls the components of the image reading device 1 based on the programs read from the ROM 41. The flash PROM 43 is a readable and writable non-volatile memory that stores various data generated during control processes performed by the CPU 40, for example, data calculated in the main maintenance process. The RAM 42 temporarily stores the results of calculations generated during control processes performed by the CPU 40.

The device control unit 44 is further connected to the reading unit 24, and transmits, to the light source 30, a signal for controlling turning on/off of the light source 30 and a signal for controlling the value of electric current flowing to the light source 30 in response to commands from the CPU 40. Further, the device control unit 44 transmits, to the light receiving portion 31, serial-in signal SI and a clock signal CLK in response to commands from the CPU 40, as illustrated in FIG. 3. The serial-in signal SI is a signal for simultaneously transferring electrical signals from the plurality of photoelectric conversion elements 33 in the chips CH1 through CH12 of the light receiving portion 31 to the shift registers. The clock signal CLK is a signal for sequentially outputting electrical signals from the shift registers. Upon receiving the control signals from the device control unit 44, the reading unit 24 turns on the light source 30, and transmits analog signals corresponding to the intensity of light received by the light receiving portion 31 to the AFE 45. The maximum intensity of light emitted from the light source 30 is determined in accordance with the predetermined maximum current value and the maximum period of time for which the light source 30 can be turned on during the interval of the serial-in signals SI (hereinafter referred to as the "maximum lighting period").

The AFE 45 is connected to the reading unit 24, and converts an analog signal transmitted from the reading unit 24 to digital data in response to commands from the CPU 40. The AFE 45 has a predetermined input range and a predetermined resolution. For example, the resolution of the AFE 45 is 10 bits for gradations from "0" to "1023." In this case, the AFE 45 converts an analog signal transmitted from the reading unit 24 to 10-bit gradation data (values between 0 and 1023) as digital data. The digital data converted by the AFE 45 is transmitted to the image processing unit 46. An offset adjustment value for offset-adjusting an analog signal transmitted from the reading unit 24 and a gain adjustment value for gain-adjusting an offset analog signal are set in the AFE 45. The AFE 45 converts the analog signals subjected to the offset adjustment and the gain adjustment to digital data.

The image processing unit 46 is configured of an application specific integrated circuit (ASIC) dedicated for image processing, and performs various image processes on the digital data, including image correction such as shading compensation and gamma compensation. The image processing unit 46 can be set so as to perform none of various image processes or perform all the various image processes. The image processing unit 46 performs each of set image processes on the digital data and generates digital image data. The digital image data is transmitted via the bus 48 to be stored in the RAM 42. The shading compensation includes white correction and black correction. Black correction data and white correction data are set for the black correction and the white correction, respectively. For example, when the image processing unit 46 is set so that the gamma compensation is not performed but the shading compensation is performed, the image processing unit 46 performs the black correction on the digital data according to the set black correction data and then performs the white correction on the black-corrected digital data according to the set white correction data to generate the digital image data.

The drive circuit 47 is connected to the conveyance motor MT, and drives the conveyance motor MT in response to a drive instruction transmitted from the CPU 40. The drive circuit 47 rotates the conveyance motor MT in accordance with a rotation amount and a rotation direction instructed by the drive instruction. When the conveyance motor MT rotates a prescribed rotation amount, the conveying rollers 23 and 26 rotate a prescribed angle, and the original sheet GS is conveyed a prescribed distance on the conveyance path 20.

<Operations>

Next, operations performed on the image reading device 1 will be described with reference to the drawings. The image reading device 1 mainly executes a main maintenance process executed prior to reading an original sheet GS, and a main reading process to read the original sheet GS. The CPU 40 executes the processes in steps M1-M20 for the main maintenance process, the processes in steps R1-R9 for the main reading process, and the steps for each subroutine for these processes. In the present embodiment, data processing performed by the CPU 40 for each pixel in one line worth is performed for pixels of three colors in the color mode and for pixels of one specific color in the mono mode. In the present embodiment, the description will be made for the color mode.

(Main Maintenance Process)

Figure 5:
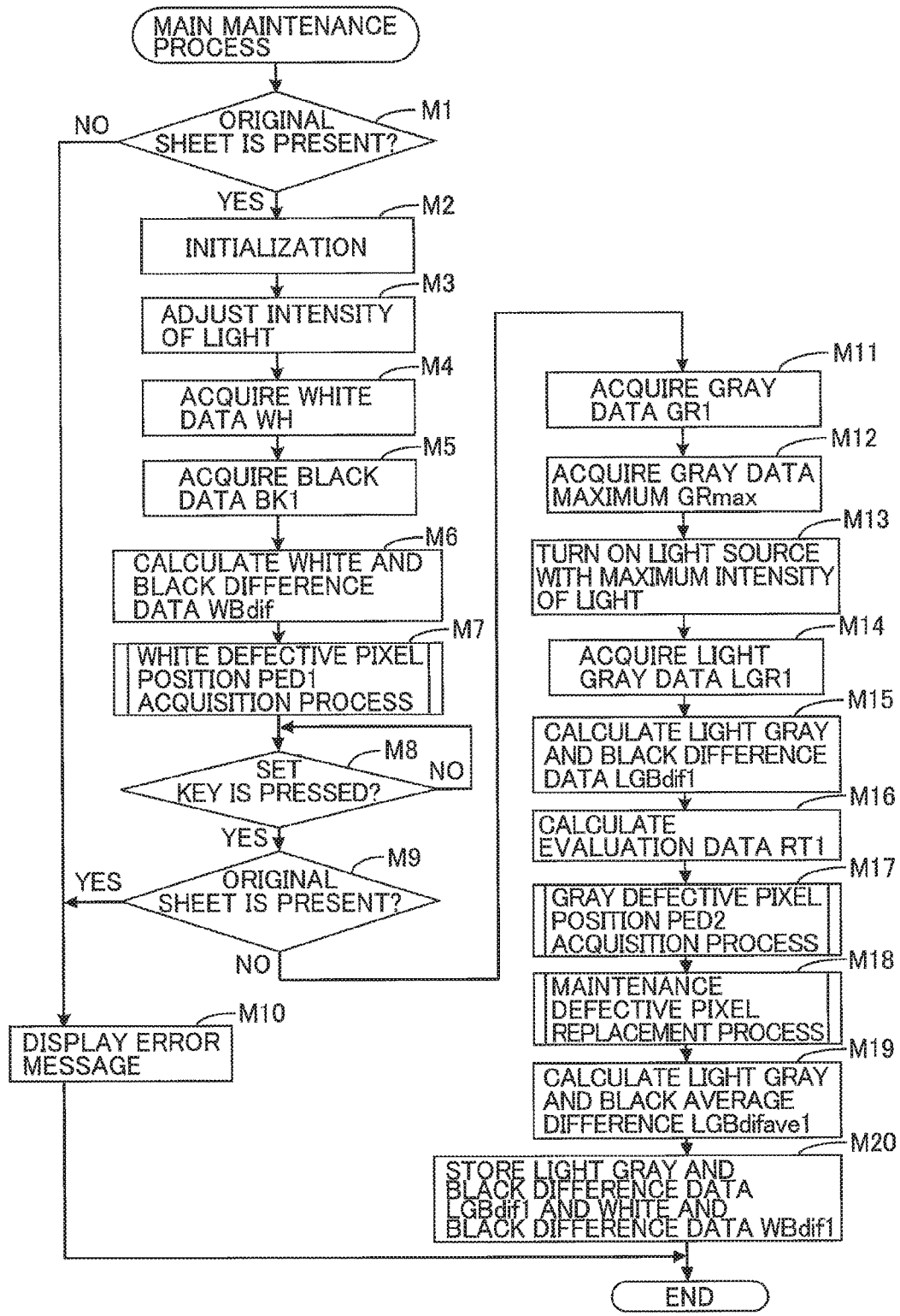
FIG. 5 is a flowchart illustrating steps in a main maintenance process.

The CPU 40 begins the main maintenance process illustrated in FIG. 5 in response to an operation of an operator such as a service person on the operating unit 5 in the image reading device 1 in accordance with a specific method of operation before the image reading device 1 is shipped from a factory or when the service person performs a maintenance checkup after shipment of the image reading device 1.

When the operator first places a specific white reference original sheet WGS served as a white reference on the feed tray 2, the original sensor 27 detects the white reference original sheet WGS. In M1 the CPU 40 determines whether the white reference original sheet WGS is present on the feed tray 2 in accordance with a detection signal from the original sensor 27. More specifically, when the original sensor 27 is ON, the CPU 40 determines that the white reference original sheet WGS is present on the feed tray 2 (M1: YES), and advances to the process in M2. When the original sensor 27 is OFF, the CPU 40 determines that the white reference original sheet WGS is not present on the feed tray 2 (M1: NO), and advances to the process in M10. In M10 the CPU 40 displays, on the display unit 6, an error message notifying that a placement state of original sheets GS is not correct, and ends the main maintenance process.

In M2 the CPU 40 controls the drive circuit 47 to feed the white reference original sheet WGS to the platen glass 25, and initializes the device control unit 44, the AFE 45, and the image processing unit 46. More specifically, the CPU 40 transmits a drive instruction to the drive circuit 47 to feed the white reference original sheet WGS placed on the feed tray 2 to the platen glass 25. The CPU 40 also acquires, from the flash PROM 43, the setting of the clock signal CLK and the serial-in signal SI corresponding to the reading resolution of 300 DPI, and sets the setting to the device control unit 44. The CPU 40 acquires, from the flash PROM 43, the setting of a signal to be transmitted to the light source 30 adapted to the color mode, and sets the setting to the device control unit 44. The CPU 40 acquires, from the flash PROM 43, an offset adjustment value and a gain adjustment value of the AFE 45, and sets the setting to the AFE 45. The CPU 40 configures the image processing unit 46 to perform none of various image processes.

In M3 the CPU 40 adjusts the intensity of light emitted from the light source 30. More specifically, the CPU 40 controls the light source 30 to emit light toward the white reference original sheet WGS, and adjusts the intensity ST of light in each color so that an analog signal generated when the light reflected off the white reference original sheet WGS is read represents the maximum in the input range of the AFE 45. The intensity ST of light is determined in accordance with lighting time and a current value of the light source 30 for each of the colors in one line. The colors described above are red, blue, and green, which are used in the color mode.

In M4 the CPU 40 acquires white data WH. More specifically, the CPU 40 turns on the light source 30 with the intensity ST of light for each color, and controls the reading unit 24 to read the white reference original sheet WGS. The CPU 40 then acquires one line worth of digital image data of each pixel for each color being read as the white data WH.

In M5 the CPU 40 acquires black data BK1. More specifically, the CPU 40 turns off the light source 30, and controls the reading unit 24 to read the white reference original sheet WGS. The CPU 40 then acquires one line worth of digital image data of each pixel for one color being read as the black data BK1. The one color described above is one dark color obtained when the light source 30 is turned off.

In M6 the CPU 40 calculates white and black difference data WBdif. More specifically, the CPU 40 calculates one line worth of the white and black difference data WBdif of each pixel for each color by subtracting the black data BK1 of each pixel in one line for each color from the white data WH of the corresponding pixel for the corresponding color. The CPU 40 stores one line worth of the white and black difference data WBdif of each pixel for each color in the RAM 42.

In M7 the CPU 40 acquires white defective pixel position PED1. While the process executed in M7 will be described later in detail as a white defective pixel position PED1 acquisition process, the description will be made for the process in M7 briefly. The CPU 40 sequentially designates the pixels from the first pixel to the last pixel one by one as a target pixel TPX. The CPU 40 calculates a white average WAV of the target pixel TPX by averaging the white and black difference data WBdif for three pixels at positions away from the target pixel TPX by five pixels, ten pixels, and fifteen pixels, respectively. The CPU 40 calculates a range having an upper limit and a lower limit as a threshold range TH1 of the target pixel TPX. Here, the upper limit of the threshold range TH1 is obtained by adding a white addition value to the white average WAV, and the lower limit of the threshold range TH1 is obtained by subtracting a white subtraction value from the white average WAV. The CPU 40 then determines whether the white and black difference data WBdif of the target pixel TPX falls within the threshold range TH1 so as to determine whether the white and black difference data WBdif of the target pixel TPX is defective. When the CPU 40 determines that the white and black difference data WBdif of the target pixel TPX is defective, the CPU 40 stores, in the flash PROM 43, the pixel number PN of the target pixel TPX determined to be defective as the white defective pixel position PED1. The CPU 40 repeats the above described processes until the last pixel is designated as the target pixel TPX and the processes for the last pixel are completed. In the present embodiment, the white addition value and the white subtraction value described above are the same value of four percent of white average WAV. In the present embodiment, the white average WAV is calculated by using three pixels at intervals of five pixels from the target pixel TPX as described above, because the distance of the interval between two adjacent lenses included in the rod lens array 32 is 0.4 mm and the number of the photoelectric conversion elements 33 included in each interval is 4.72 pixels. That is the reason why the above described calculation is performed by using the three pixels at intervals of five pixels. In processes of M17, MA3, MA4, MB3, MB4, R7, RA4, and RA5 described later, the intervals of five pixels are also employed for the same reason.

After completing the process of M7, in M8 the CPU 40 waits until the set key in the operating unit 5 is pressed and the image reading device 1 is set to be in a standby state. After the operator removes the remaining white reference original sheets WGS, if present, from the feed tray 2 and presses the set key (M8: YES), in M9 the CPU 40 determines whether the white reference original sheet WGS is present on the feed tray 2. When the original sensor 27 is OFF, the CPU 40 determines that the white reference original sheet WGS is not present (M9: NO), and advances to the process in M11. When the original sensor 27 is ON, the CPU 40 determines that the white reference original sheet WGS is present (M9: YES), and advances to the process in M10. In M10 the CPU 40 displays, on the display unit 6, the error message notifying that a placement state of an original sheet GS is not correct, and ends the main maintenance process.

In M11 the CPU 40 acquires gray data GR1. More specifically, the CPU 40 turns on the light source 30 with the intensity ST of light in each color to irradiate the surface of the gray reference plate 34, and controls the reading unit 24 to read the surface of the gray reference plate 34. The CPU 40 acquires one line worth of digital image data of each pixel for each color being read as the gray data GR1.

In M12 the CPU 40 acquires a gray data maximum GRmax. The CPU 40 acquires, as the gray data maximum GRmax, the maximum value of the gray data GR1 for each color from one line worth of the gray data GR1 of each pixel for each color acquired in M11. The CPU 40 stores, in the flash PROM 43, the gray data maximum GRmax for each color in association with the corresponding color.

In M13 the CPU 40 turns on the light source 30 with the maximum intensity of light in each color. More specifically, the CPU 40 turns on the light source 30 with the predetermined maximum current value in each color and the maximum lighting period for the reading resolution of 300 DPI.

In M14 the CPU 40 acquires light gray data LGR1. More specifically, the CPU 40 turns on the light source 30 with the maximum intensity of light in each color to irradiate the surface of the gray reference plate 34, and controls the reading unit 24 to read the surface of the gray reference plate 34. The CPU 40 acquires one line worth of digital image data of each pixel for each color being read as the light gray data LGR1.

In M15 the CPU 40 calculates light gray and black difference data LGBdif1. More specifically, the CPU 40 calculates one line worth of the light gray and black difference data LGBdif1 of each pixel for each color by subtracting the black data BK1 of each pixel in one line for each color from the light gray data LGR1 of the corresponding pixel for the corresponding color.

In M16 the CPU 40 calculates evaluation data RT1. More specifically, the CPU 40 calculates one line worth of the evaluation data RT1 of each pixel for each color by dividing the light gray and black difference data LGBdif1 of each pixel in one line for each color by the white and black difference data WBdif of the corresponding pixel for the corresponding color.

In M17 the CPU 40 acquires gray defective pixel position PED2. While the process executed in M17 will be described later in detail as a gray defective pixel position PED2 acquisition process, the description will be made for the process in M17 briefly. The CPU 40 sequentially designates the pixels from the first pixel to the last pixel one by one as a target pixel TPX. The CPU 40 calculates a gray average GAV1 of the target pixel TPX by averaging the evaluation data RT1 for three pixels at positions away from the target pixel TPX by five pixels, ten pixels, and fifteen pixels, respectively. The CPU 40 calculates a range having an upper limit and a lower limit as a threshold range TH2 of the target pixel TPX. Here, the upper limit of the threshold range TH2 is obtained by adding a maintenance addition value to the gray average GAV1, and the lower limit of the threshold range TH2 is obtained by subtracting a maintenance subtraction value from the gray average GAV1. The CPU 40 then determines whether the evaluation data RT1 of the target pixel TPX falls within the threshold range TH2 so as to determine whether the evaluation data RT1 of the target pixel TPX is defective. When the CPU 40 determines that the evaluation data RT1 of the target pixel TPX is defective, the CPU 40 stores, in the flash PROM 43, the pixel number PN of the target pixel TPX determined to be defective as the gray defective pixel position PED2. The CPU 40 repeats the above described processes until the last pixel is designated as the target pixel TPX and the processes for the last pixel are completed. In the present embodiment, the maintenance addition value and the maintenance subtraction value described above are the same value of four percent of the gray average GAV1.

In M18 the CPU 40 replaces the white and black difference data WBdif of pixels at the white defective pixel position PED1 with other data, and replaces the light gray and black difference data LGBdif1 of pixels at the gray defective pixel position PED2 with other data. While the process executed in M18 will be described later in detail as a maintenance defective pixel replacement process, the description will be made for the process in M18 briefly. The CPU 40 determines whether all pixels are normal. If all the pixels are normal, the CPU 40 ends the maintenance defective pixel position replacement process of M18. If any of the pixels is not normal, the CPU 40 calculates a difference between the white and black difference data WBdif and the light gray and black difference data LGBdif1 of each pixel in one line for each color. The CPU 40 calculates a white and light gray average difference WLGdif1 by averaging the differences of all pixels in one line for each color. The CPU 40 sequentially designates pixels at the white defective pixel position PED1 and pixels at the gray defective pixel position PED2 one by one as a target defective pixel TAPX. The CPU 40 determines whether the pixel number PN of the target defective pixel TAPX is stored in the flash PROM 43 as both the white defective pixel position PED1 and the gray defective pixel position PED2. If the pixel number PN is stored as both the white defective pixel position PED1 and the gray defective pixel position PED2, the CPU 40 replaces the white and black difference data WBdif of the target defective pixel TAPX with the white and black difference data WBdif of a peripheral pixel, and replaces the light gray and black difference data LGBdif1 of the target defective pixel TAPX with the light gray and black difference data LGBdif1 of the peripheral pixel. If the pixel number PN is stored on as either one of the white defective pixel position PED1 and the gray defective pixel position PED2, the CPU 40 determines whether the pixel number PN of the target defective pixel TAPX is stored as the gray defective pixel position PED2. If the pixel number PN is stored as the gray defective pixel position PED2, the CPU 40 replaces the light gray and black difference data LGBdif1 of the target defective pixel TAPX with a value obtained by subtracting the white and light gray average difference WLGdif1 from the white and black difference data WBdif of the target defective pixel TAPX. If the pixel number PN is not stored as the gray defective pixel position PED2 but stored as the white defective pixel position PED1, the CPU 40 replaces the white and black difference data WBdif of the target defective pixel TAPX with a value obtained by adding the white and light gray average difference WLGdif1 to the light gray and black difference data LGBdif1 of the target defective pixel TAPX. The CPU 40 repeats the above described processes for all pixels at the white defective pixel position PED1 and the gray defective pixel position PED2.

In M19 the CPU 40 calculates a light gray and black average difference LGBdifave1. More specifically, the CPU 40 calculates the light gray and black average difference LGBdifave1 by averaging the light gray and black difference data LGBdif1 of all pixels in one line for each color. The CPU 40 stores the light gray and black average difference LGBdifave1 in the flash PROM 43.

In M20 the CPU 40 stores, in the flash PROM 43, one line worth of the light gray and black difference data LGBdif1 and one line worth of the white and black difference data WBdif of each pixel for each color replaced in M18, and ends the main maintenance process.

(White Defective Pixel Position PED1 Acquisition Process)

Figure 6:
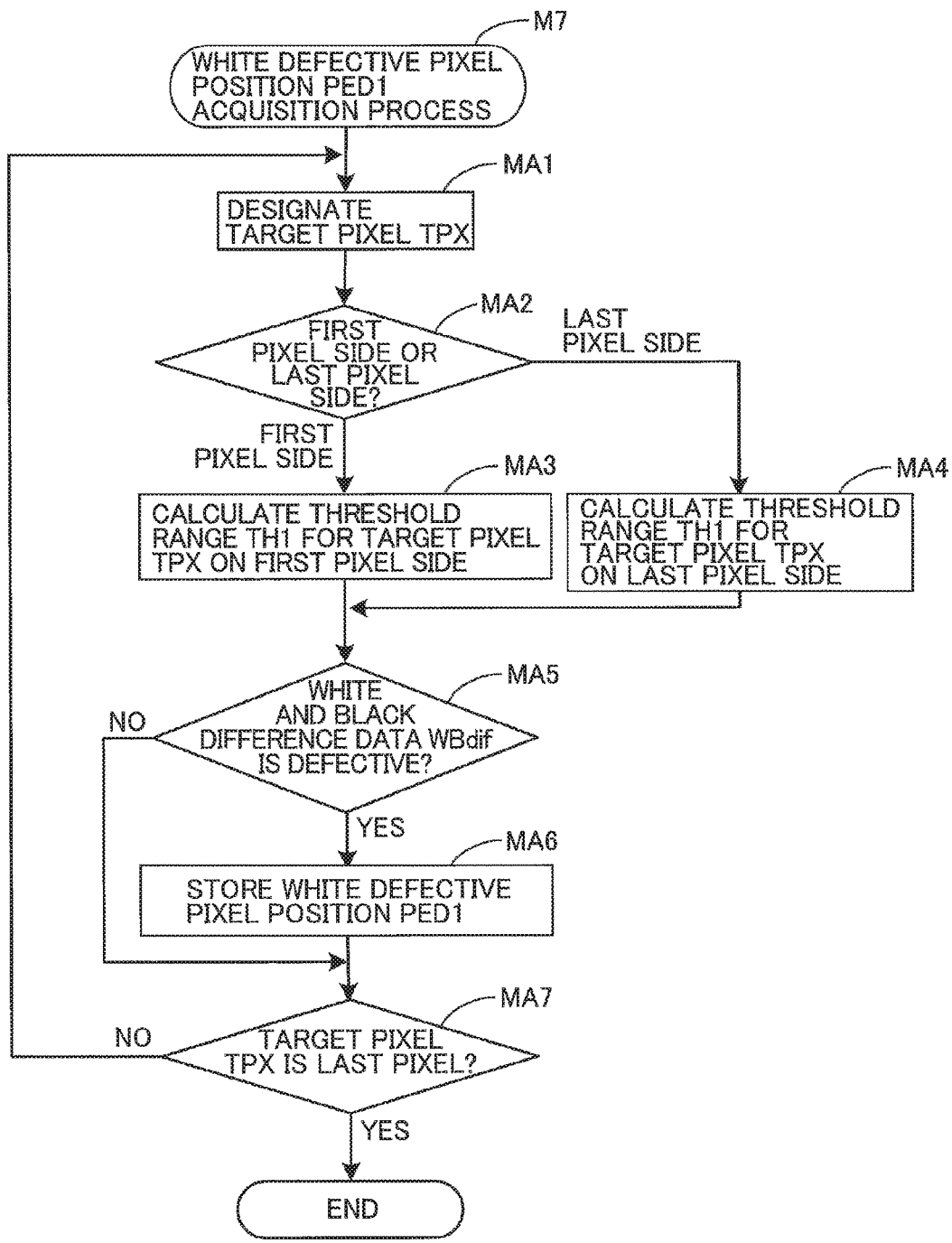
FIG. 6 is a flowchart illustrating steps in a white defective pixel position acquisition process executed in the main maintenance process illustrated in FIG. 5.

Next, the white defective pixel position PED1 acquisition process executed in M7 of the main maintenance process illustrated in FIG. 5 will be described in detail with reference to FIG. 6. When the white defective pixel position PED1 acquisition process is started, in MA1 the CPU 40 designates a target pixel TPX. More specifically, when the pixel number PN of the target pixel TPX has already been designated in the RAM 42, the CPU 40 designates a next pixel of the currently designated target pixel TPX as a new target pixel TPX. If the target pixel TPX is not designated, the CPU 40 designates the first pixel as the target pixel TPX. The CPU 40 counts the number of designated pixels after the first pixel is designated as the target pixel TPX to acquire the pixel number PN of the target pixel TPX, and stores the acquired pixel number PN in the RAM 42.

In MA2 the CPU 40 determines whether the target pixel TPX is located on the first pixel side or the last pixel side in the chip CH. More specifically, when a remainder resulting from dividing the pixel number PN of the target pixel TPX by 216 which is the number of pixels in the chip CH is smaller than or equal to 108, the CPU 40 determines that the target pixel TPX is located on the first pixel side in the chip CH (MA2: FIRST PIXEL SIDE), and advances to the process in MA3. When the remainder obtained by dividing the pixel number PN of the target pixel TPX by 216 is greater than 108, the CPU 40 determines that the target pixel TPX is on the last pixel side in the chip CH (MA2: LAST PIXEL SIDE), and advances to the process in MA4.

In MA3 the CPU 40 calculates a threshold range TH1 for the target pixel TPX on the first pixel side. More specifically, the CPU 40 calculates a white average WAV by averaging the white and black difference data WBdif for three pixels at positions away from the target pixel TPX by five pixels, ten pixels, and fifteen pixels toward the last pixel side, respectively. The CPU 40 calculates an upper limit by adding a white addition value to the white average WAV, and a lower limit by subtracting a white subtraction value from the white average WAV. The CPU 40 sets a range having the upper limit and the lower limit as the threshold range TH1 for the target pixel TPX. After completing the process in MA3, the CPU 40 advances to the process in MA5. In the present embodiment, the white addition value and the white subtraction value are the same value which is four percent of the white average WAV. The four percent of the white average WAV is a numerical value corresponding to the extent of irregular fluctuation of the white and black difference data WBdif.

In MA4 the CPU 40 calculates a threshold range TH1 for the target pixel TPX on the last pixel side. More specifically, the CPU 40 calculates a white average WAV by averaging the white and black difference data WBdif for three pixels at positions away from the target pixel TPX by five pixels, ten pixels, and fifteen pixels toward the first pixel side, respectively. The CPU 40 calculates an upper limit by adding a white addition value to the white average WAV, and a lower limit by subtracting a white subtraction value from the white average WAV. The CPU 40 sets a range having the upper limit and the lower limit as the threshold range TH1 for the target pixel TPX. After completing the process in MA4, the CPU 40 advances to the process in MA5. In the present embodiment, the white addition value and the white subtraction value are the same value which is four percent of the white average WAV.

In MA5 the CPU 40 determines whether the white and black difference data WBdif of the target pixel TPX is defective. More specifically, the CPU 40 determines whether the white and black difference data WBdif of the target pixel TPX falls within the threshold range TH1 calculated in MA3 or MA4. When the white and black difference data WBdif falls within the threshold range TH1, the CPU 40 determines that the white and black difference data WBdif of the target pixel TPX is not defective (MA5: NO), and advances to the process in MA7. When the white and black difference data WBdif is out of the threshold range TH1, the CPU 40 determines that the white and black difference data WBdif of the target pixel TPX is defective (MA5: YES), and advances to the process in MA6.

In MA6 the CPU 40 stores, in the flash PROM 43, the pixel number PN of the target pixel TPX as the white defective pixel position PED1.

In MA7 the CPU 40 whether the target pixel TPX is the last pixel. More specifically, the CPU 40 determines whether the pixel number PN of the target pixel TPX is 2592 which is the pixel number PN of the last pixel in the present embodiment. When the pixel number PN is not 2592, the CPU 40 determines that the target pixel TPX is not the last pixel (MA7: NO), and returns to the process in MA1. When the pixel number PN is 2592, the CPU 40 determines that the target pixel TPX is the last pixel (MA7: YES), deletes the designation of the target pixel TPX from the RAM 42, and ends the white defective pixel position PED1 acquisition process executed in M7 of FIG. 5.

(Gray Defective Pixel Position PED2 Acquisition Process)

Figure 7:
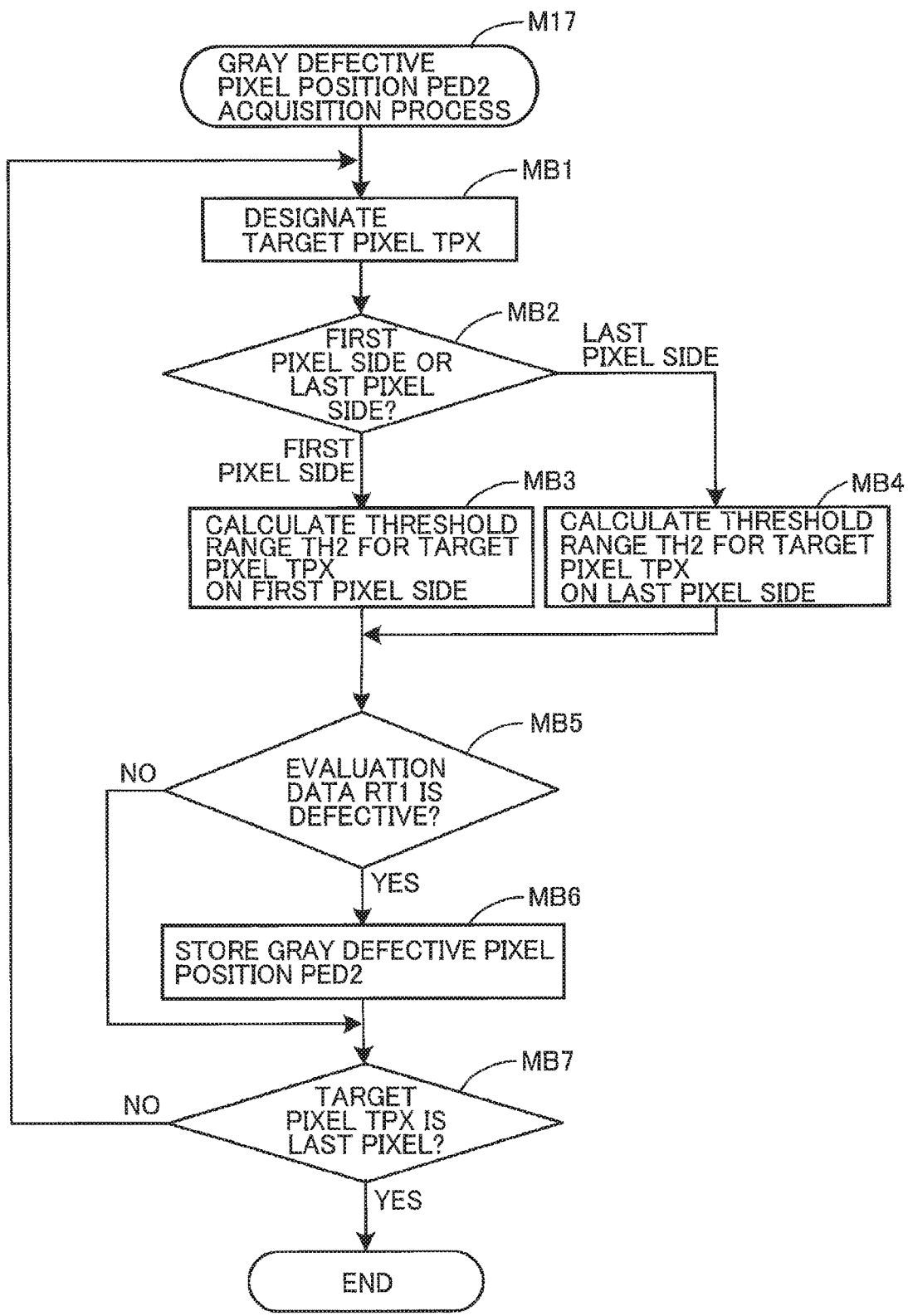
FIG. 7 is a flowchart illustrating steps in a gray defective pixel position acquisition process executed in the main maintenance process illustrated in FIG. 5.

The gray defective pixel position PED2 acquisition process executed in M17 of the main maintenance process illustrated in FIG. 5 will be described in detail with reference to FIG. 7. When the gray defective pixel position PED2 acquisition process is started, in MB1 the CPU 40 designates a target pixel TPX, similarly to the process of MA1 in the white defective pixel position PED1 acquisition process illustrated in FIG. 6.

In MB2 the CPU 40 determines whether the target pixel TPX is located on the first pixel side or the last pixel side in the chip CH, similarly to the process of MA2. When the CPU 40 determines that the target pixel TPX is on the first pixel side in the chip CH (MB2: FIRST PIXEL SIDE), the CPU 40 advances to the process in MB3. When the CPU 40 determines that the target pixel TPX is on the last pixel side in the chip CH (MB2: LAST PIXEL SIDE), the CPU 40 advances to the process in MB4.

In MB3 the CPU 40 calculates a threshold range TH2 for the target pixel TPX on the first pixel side. More specifically, the CPU 40 calculates a gray average GAV1 by averaging the evaluation data RT1 for three pixels at positions away from the target pixel TPX by five pixels, ten pixels, and fifteen pixels toward the last pixel side, respectively. The CPU 40 calculates an upper limit by adding a maintenance addition value to the gray average GAV1, and a lower limit by subtracting a maintenance subtraction value from the gray average GAV1. The CPU 40 sets a range having the upper limit and the lower limit as the threshold range TH2 for the target pixel TPX. After completing the process in MB3, the CPU 40 advances to the process in MB5. In the present embodiment, the maintenance addition value and the maintenance subtraction value are the same value which is four percent of the gray average GAV1. The four percent of the gray average GAV1 is a numerical value corresponding to the extent of irregular fluctuation of the evaluation data RT1.

In MB4 the CPU 40 calculates a threshold range TH2 for the target pixel TPX on the last pixel side. More specifically, the CPU 40 calculates a gray average GAV1 by averaging the evaluation data RT1 for three pixels at positions away from the target pixel TPX by five pixels, ten pixels, and fifteen pixels toward the first pixel side, respectively. The CPU 40 calculates an upper limit by adding a maintenance addition value to the gray average GAV1, and a lower limit by subtracting a maintenance subtraction value from the gray average GAV1. The CPU 40 sets a range having the upper limit and the lower limit as the threshold range TH2 for the target pixel TPX. After completing the process in MB4, the CPU 40 advances to the process in MB5. In the present embodiment, the maintenance addition value and the maintenance subtraction value are the same value which is four percent of the gray average GAV1.

In MB5 the CPU 40 determines whether the evaluation data RT1 of the target pixel TPX is defective, similarly to the process of MA5. When the evaluation data RT1 falls within the threshold range TH2, the CPU 40 determines that the evaluation data RT1 of the target pixel TPX is not defective (MB5: NO), and advances to the process in MB7. When the evaluation data RT1 is out of the threshold range TH2, the CPU 40 determines that the evaluation data RT1 of the target pixel TPX is defective (MB5: YES), and advances to the process in MB6.

In MB6 the CPU 40 stores, in the flash PROM 43, the pixel number PN of the target pixel TPX as the gray defective pixel position PED2.

In MB7 the CPU 40 determines whether the target pixel TPX is the last pixel, similarly to the process of MA7. When the CPU 40 determines that the target pixel TPX is not the last pixel (MB7: NO), the CPU 40 returns to the process in MB1. When the CPU 40 determines that the target pixel TPX is the last pixel (MB7: YES), the CPU 40 deletes the designation of the target pixel TPX from the RAM 42, and ends the gray defective pixel position PED2 acquisition process executed in M17 of FIG. 5.

(Maintenance Defective Pixel Replacement Process)

The maintenance defective pixel position replacement process executed in M18 of the main maintenance process illustrated in FIG. 5 will be described in detail with reference to FIG. 8. When the maintenance defective pixel position replacement process is started, in MC1 the CPU 40 determines whether all pixels are normal. More specifically, when the pixel numbers PN of all pixels are not stored as the white defective pixel position PED1 or the gray defective pixel position PED2, the CPU 40 determines that all the pixels are normal (MC1: YES), and ends the maintenance defective pixel replacement process executed in M18 of FIG. 5. When the pixel number PN of any of the pixels is stored as the white defective pixel position PED1 or the gray defective pixel position PED2, the CPU 40 determines that not all the pixels are normal (MC1: NO), and advances to the process in MC2.

In MC2 the CPU 40 calculates a white and light gray average difference WLGdif1. More specifically, the CPU 40 calculates a difference of each pixel in one line for each color by subtracting the light gray and black difference data LGBdif1 of each pixel in one line for each color from the white and black difference data WBdif of the corresponding pixel for the corresponding color. The CPU 40 calculates the white and light gray average difference WLGdif1 by averaging the differences of all pixels in one line for each color.

In MC3 the CPU 40 designates a target defective pixel TAPX. The CPU 40 sequentially sets pixels at the white defective pixel position PED1 and pixels at the gray defective pixel position PED2 one by one as the target defective pixel TAPX. More specifically, the CPU 40 determines whether the pixel number PN is stored as the white defective pixel position PED1 or the gray defective pixel position PED2 in a sequential order from the first pixel to the last pixel. If the pixel number PN is stored as either of the positions in the flash PROM 43, the CPU 40 designates the pixel having the stored pixel number PN as the target defective pixel TAPX. If the pixel number PN is not stored as either of the positions, the CPU 40 performs the determination for the next pixel.

In MC4 the CPU 40 determines whether the pixel number PN of the target defective pixel TAPX is stored in the flash PROM 43 as both the white defective pixel position PED1 and the gray defective pixel position PED2. When the pixel number PN is stored as both the white defective pixel position PED1 and the gray defective pixel position PED2 (MC4: YES), the CPU 40 advances to the process in MC5. When the pixel number PN is stored only as either the white defective pixel position PED1 or the gray defective pixel position PED2 (MC4: NO), the CPU 40 advances to the process in MC6.

In MC5 the CPU 40 replaces the white and black difference data WBdif of the target defective pixel TAPX with the white and black difference data WBdif of a peripheral pixel, and replaces the light gray and black difference data LGBdif1 of the target defective pixel TAPX with the light gray and black difference data LGBdif1 of the peripheral pixel. The peripheral pixel is a pixel positioned adjacent to or around the target defective pixel TAPX. In the present embodiment, the peripheral pixel is a pixel adjacent the target defective pixel TAPX. After completing the process in MC5, the CPU 40 advances to the process in MC9.

When negative determination is made in MC4, in MC6 the CPU 40 determines whether the pixel number PN of the target defective pixel TAPX is stored in the flash PROM 43 as the gray defective pixel position PED2. When the CPU 40 determines that the pixel number PN is stored as the gray defective pixel position PED2 (MC6: YES), the CPU 40 advances to the process in MC7. When the CPU 40 determines that the pixel number PN is not stored as the gray defective pixel position PED2 (MC6: NO), the CPU 40 advances to the process in MC8.

In MC7 the CPU 40 replaces the light gray and black difference data LGBdif1 of the target defective pixel TAPX with a value obtained by subtracting the white and light gray average difference WLGdif1 from the white and black difference data WBdif of the target defective pixel TAPX. More specifically, the CPU 40 subtracts the white and light gray average difference WLGdif1 from the white and black difference data WBdif of the target defective pixel TAPX for each color, and replaces the light gray and black difference data LGBdif1 of the target defective pixel TAPX for each color with a resultant value of the subtraction for each color. After completing the process in MC7, the CPU 40 advances to the process in MC9.

When negative determination is made in MC6, in MC8 the CPU 40 replaces the white and black difference data WBdif of the target defective pixel TAPX with a value obtained by adding the white and light gray average difference WLGdif1 to the light gray and black difference data LGBdif1 of the target defective pixel TAPX. More specifically, the CPU 40 adds the white and light gray average difference WLGdif1 to the light gray and black difference data LGBdif1 of the target defective pixel TAPX for each color, and replaces the white and black difference data WBdif of the target defective pixel TAPX for each color with a resultant value of the addition for each color.

In MC9 the CPU 40 determines whether all remaining pixels are normal. More specifically, when the pixel number PN of any of pixels from the currently designated target defective pixel to the last pixel is stored in the flash PROM 43 as the white defective pixel position PED1 or the gray defective pixel position PED2, the CPU 40 determines that not all the remaining pixels are normal (MC9: NO), and advances to the process in MC3. When the pixel number PN of all the pixels from the currently designated target defective pixel TAPX to the last pixel is not stored as the white defective pixel position PED1 or the gray defective pixel position PED2, the CPU 40 determines that all the remaining pixels are normal (MC9: YES), and ends the maintenance defective pixel replacement process executed in M18 of FIG. 5.

(Main Reading Process)

Figure 9:
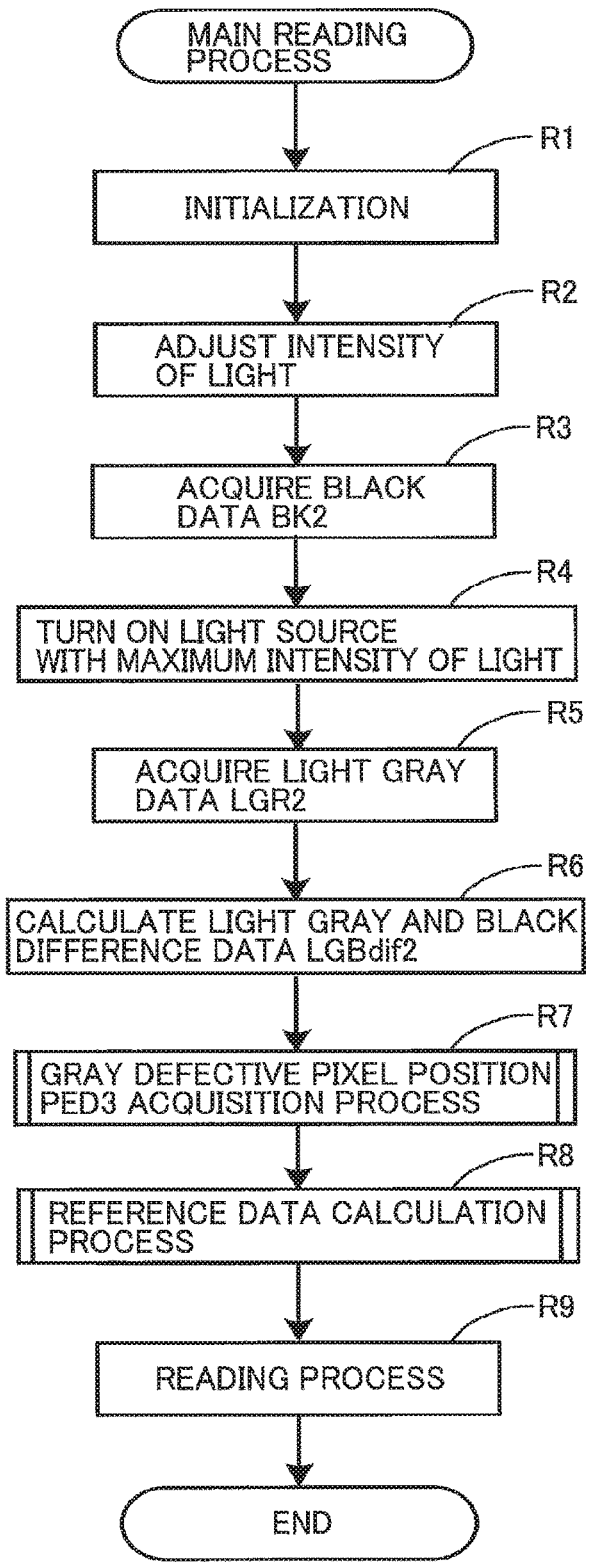
FIG. 9 is a flowchart illustrating steps in a main reading process.

The CPU 40 begins the main reading process illustrated in FIG. 9 when a user presses a start button for instructing the start of a color reading operation on the operating unit 5 after first placing original sheets GS on the feed tray 2. In the present embodiment, the description will be made for the main reading process performed when the color mode is set.

In R1 the CPU 40 initializes the device control unit 44, the AFE 45, and the image processing unit 46. More specifically, the CPU 40 acquires the setting of the clock signal CLK and the serial-in signal SI corresponding to the reading resolution of 300 DPI from the flash PROM 43, and sets the setting to the device control unit 44. The CPU 40 acquires the setting of a signal to be transmitted to the light source 30 adapted to the color mode from the flash PROM 43, and sets the setting to the device control unit 44. The CPU 40 acquires an offset adjustment value and a gain adjustment value of the AFE 45 from the flash PROM 43, and sets the setting to the AFE 45. The CPU 40 configures the image processing unit 46 to perform none of various image processes.

In R2 the CPU 40 adjusts the intensity of light emitted from the light source 30. More specifically, the CPU 40 controls the light source 30 to emit light toward the surface of the gray reference plate 34, and adjusts the intensity ST of light in each color so that a maximum value of digital image data obtained when the light reflected off the surface of the gray reference plate 34 is read represents the gray data maximum GRmax.

In R3 the CPU 40 acquires black data BK2. More specifically, the CPU 40 turns off the light source 30, and controls the reading unit 24 to read the surface of the gray reference plate 34. The CPU 40 then acquires one line worth of digital image data for one color of each pixel being read as the black data BK2.

In R4 the CPU 40 turns on the light source 30 with the maximum intensity of light in each color. More specifically, the CPU 40 turns on the light source 30 with the predetermined maximum current value in each color and the maximum lighting period for the reading resolution of 300 DPI.

In R5 the CPU 40 acquires light gray data LGR2. More specifically, the CPU 40 turns on the light source 30 with the maximum intensity of light in each color to irradiate the surface of the gray reference plate 34, and controls the reading unit 24 to read the surface of the gray reference plate 34. The CPU 40 acquires one line worth of digital image data of each pixel for each color being read as the light gray data LGR2.

In R6 the CPU 40 calculates light gray and black difference data LGBdif2. More specifically, the CPU 40 calculates one line worth of the light gray and black difference data LGBdif2 of each pixel for each color by subtracting the black data BK2 of each pixel in one line for each color from the light gray data LGR2 of the corresponding pixel for the corresponding color.

In R7 the CPU 40 acquires gray defective pixel position PED3. While the process executed in R7 will be described later in detail as a gray defective pixel position PED3 acquisition process, the description will be made for the process in R7 briefly. The CPU 40 calculates evaluation data RT2. The CPU 40 sequentially designates the pixels from the first pixel to the last pixel one by one as a target pixel TPX. The CPU 40 calculates a gray average GAV2 of the target pixel TPX by averaging the evaluation data RT2 for three pixels at positions away from the target pixel TPX by five pixels, ten pixels, and fifteen pixels, respectively. The CPU 40 sets a range having an upper limit and a lower limit as a threshold range TH3 of the target pixel TPX. Here, the upper limit of the threshold range TH3 is obtained by adding a reading addition value to the gray average GAV2, and the lower limit of the threshold range TH3 is obtained by subtracting a reading subtraction value from the gray average GAV2. The CPU 40 then determines whether the evaluation data RT2 of the target pixel TPX falls within the threshold range TH3 so as to determine whether the evaluation data RT2 of the target pixel TPX is defective. When the CPU 40 determines that the evaluation data RT2 of the target pixel TPX is defective, the CPU 40 stores, in the flash PROM 43, the pixel number PN of the target pixel TPX determined to be defective as the gray defective pixel position PED3. The CPU 40 replaces the light gray and black difference data LGBdif2 at the gray defective pixel position PED3 to other data. The CPU 40 repeats the above described processes until the last pixel is designated as the target pixel TPX and the processes for the last pixel are completed. In the present embodiment, the reading addition value and the reading subtraction value described above are the same absolute value which is 0.04. 0.04 is a numerical value corresponding to the extent of irregular fluctuation of the evaluation data RT2.

In R8 the CPU 40 calculates reference data CD. While the process executed in R8 will be described later in detail as a reference data calculation process, the description will be made for the process executed in R8 briefly. The CPU 40 calculates light gray and black average difference LGBdifave2 for each color by averaging the light gray and black difference data LGBdif2 of all pixels in one line for each color. The CPU 40 multiplies the white and black difference data WBdif by a variable ratio SCRT described later and an average ratio AVRT described later to calculate the reference data CD of each pixel in one line worth for each color.

In R9 the CPU 40 executes a reading process. More specifically, the CPU 40 configures setting values for performing various image processes. The CPU 40 outputs an instruction to the drive circuit 47 to convey an original sheet GS. The CPU 40 controls the reading unit 24 to read the conveyed original sheet GS. The CPU 40 also controls the image processing unit 46 to perform shading compensation using the reference data CD calculated in R8 and perform various image processes to generate digital image data. After completing the reading process in R9, the main reading process is ended.

(Gray Defective Pixel Position PED3 Acquisition Process)

The gray defective pixel position PED3 acquisition process executed in R7 of the main reading process illustrated in FIG. 9 will be described in detail with reference to FIG. 10. When the gray defective pixel position PED3 acquisition process is started, in RA1 the CPU 40 calculates evaluation data RT2. More specifically, the CPU 40 calculates one line worth of the evaluation data RT2 of each pixel for each color by dividing the light gray and black difference data LGBdif2, which is acquired in the process of R6 in the main reading process illustrated in FIG. 9, of each pixel in one line for each color by the light gray and black difference data LGBdif1, which is acquired in the process of M15 in the main maintenance process illustrated in FIG. 5, of the corresponding pixel for the corresponding color.

In RA2 the CPU 40 designates a target pixel TPX. More specifically, when the pixel number PN of the target pixel TPX has already been designated in the RAM 42, the CPU 40 designates a next pixel of the currently designated target pixel TPX as a new target pixel TPX. If the target pixel TPX is not designated, the CPU 40 designates the first pixel as the target pixel TPX. The CPU 40 counts the number of designated pixels after the first pixel is designated as the target pixel TPX to acquire pixel number PN of the target pixel TPX, and stores the acquired pixel number PN in the RAM 42.

In RA3 the CPU 40 determines whether the target pixel TPX is located on the first pixel side or the last pixel side in the chip CH. More specifically, when a remainder resulting from dividing the pixel number PN of the target pixel TPX by 216 which is the number of pixels in the chip CH is smaller than or equal to 108, the CPU 40 determines that the target pixel TPX is located on the first pixel side in the chip CH (RA3: FIRST PIXEL SIDE), and advances to the process in RA4. When the remainder obtained by dividing the pixel number PN of the target pixel TPX by 216 is greater than 108, the CPU 40 determines that the target pixel TPX is on the last pixel side in the chip CH (RA3: LAST PIXEL SIDE), and advances to the process in RA5.

In RA4 the CPU 40 sets a threshold range TH3 for the target pixel TPX on the first pixel side. More specifically, the CPU 40 calculates a gray average GAV2 by averaging the evaluation data RT2 for three pixels at positions away from the target pixel TPX by five pixels, ten pixels, and fifteen pixels toward the last pixel side, respectively. The CPU 40 calculates an upper limit by adding a reading addition value to the gray average GAV2, and a lower limit by subtracting a reading subtraction value from the gray average GAV2. The CPU 40 sets a range having the upper limit and the lower limit as the threshold range TH3 for the target pixel TPX. After completing the process in RA4, the CPU 40 advances to the process in RA6. In the present embodiment, the reading addition value and the reading subtraction value are the same absolute value which is 0.04. 0.04 is a numerical value corresponding to the extent of irregular fluctuation of the evaluation data RT2.

In RA5 the CPU 40 sets a threshold range TH3 for the target pixel TPX on the last pixel side. More specifically, the CPU 40 calculates a gray average GAV2 by averaging the evaluation data RT2 for three pixels at positions away from the target pixel TPX five pixels, ten pixels, and fifteen pixels toward the first pixel side, respectively. The CPU 40 calculates an upper limit by adding a reading addition value to the gray average GAV2, and a lower limit by subtracting a reading subtraction value from the gray average GAV2. The CPU 40 sets a range having the upper limit and the lower limit as the threshold range TH3 for the target pixel TPX. After completing the process in RA5, the CPU 40 advances to the process in RA6. In the present embodiment, the reading addition value and the reading subtraction value are the same absolute value which is 0.04.

In RA6 the CPU 40 determines whether the evaluation data RT2 of the target pixel TPX is defective. More specifically, the CPU 40 determines whether the evaluation data RT2 of the target pixel TPX falls within the threshold range TH3 calculated in RA4 or RA5. When the evaluation data RT2 falls within the threshold range TH3, the CPU 40 determines that the evaluation data RT2 of the target pixel TPX is not defective (RA6: NO), and advances to the process in RA9. When the evaluation data RT2 is out of the threshold range TH3, the CPU 40 determines that the evaluation data RT2 of the target pixel TPX is defective (RA6: YES), and advances to the process in RA7.

In RA7 the CPU 40 stores, in the flash PROM 43, the pixel number PN of the target pixel TPX as the gray defective pixel position PED3.

In RA8 the CPU 40 replaces the light gray and black difference data LGBdif2 of the target pixel TPX with other data. While the process executed in RA8 will be described later in detail as a reading defective pixel replacement process, the description will be made for the process executed in RA8 briefly. The CPU 40 calculates a difference between the white and black difference data WBdif and the light gray and black difference data LGBdif2 of each pixel in one line for each color. The CPU 40 calculates a white and light gray average difference WLGdif2 by averaging the differences of all pixels in one line for each color. The CPU 40 determines whether the pixel number PN of the target pixel TPX is stored in the flash PROM 43 as the white defective pixel position PED1. If the pixel number PN is stored as the white defective pixel position PED1, the CPU 40 replaces the light gray and black difference data LGBdif2 of the target pixel TPX with the light gray and black difference data LGBdif2 of a peripheral pixel. If the pixel number PN is not stored as the white defective pixel position PED1, the CPU 40 replaces the light gray and black difference data LGBdif2 of the target pixel TPX with a value obtained by subtracting the white and light gray average difference WLGdif2 from the white and black difference data WBdif of the target pixel TPX.

In RA9 the CPU 40 determines whether the target pixel TPX is the last pixel. More specifically, the CPU 40 determines whether the pixel number PN of the target pixel TPX is 2592 which is the pixel number PN of the last pixel in the present embodiment. When the pixel number PN is not 2592, the CPU 40 determines that the target pixel TPX is not the last pixel (RA9: NO), and returns to the process in RA2. When the pixel number PN is 2592, the CPU 40 determines that the target pixel TPX is the last pixel (RA9: YES), and ends the gray defective pixel position PED3 acquisition process executed in R7 of FIG. 9.

(Reading Defective Pixel Replacement Process)

The reading defective pixel replacement process executed in RA8 of the gray defective pixel position PED3 acquisition process illustrated in FIG. 10 will be described in detail with reference to FIG. 11. When the reading defective pixel replacement process is started, in RB1 the CPU 40 calculates a white and light gray average difference WLGdif2. More specifically, the CPU 40 calculates a difference of each pixel in one line for each color by subtracting the light gray and black difference data LGBdif2 of each pixel in one line for each color from the white and black difference data WBdif of the corresponding pixel for the corresponding color. The CPU 40 calculates the white and light gray average difference WLGdif2 by averaging the differences of all pixels in one line for each color.

In RB2 the CPU 40 determines whether the pixel number PN of the target pixel TPX is stored in the flash PROM 43 as the white defective pixel position PED1. When the pixel number PN is stored as the white defective pixel position PED1 (RB2: YES), the CPU 40 advances to the process in RB3. When the pixel number PN is not stored as the white defective pixel position PED1 (RB2: NO), the CPU 40 advances to the process in RB4.

In RB3 the CPU 40 replaces the light gray and black difference data LGBdif2 of the target pixel TPX with the light gray and black difference data LGBdif2 of a peripheral pixel. The peripheral pixel is a pixel positioned adjacent to or around the target pixel TPX. In the present embodiment, the peripheral pixel is a pixel adjacent the target pixel TPX. After completing the process in RB3, the CPU 40 ends the reading defective pixel replacement process executed in RA8 of FIG. 10.

When negative determination is made in RB2, in RB4 the CPU 40 replaces the light gray and black difference data LGBdif2 of the target pixel TPX with a value obtained by subtracting the white and light gray average difference WLGdif2 from the white and black difference data WBdif of the target pixel TPX. More specifically, the CPU 40 subtracts the white and light gray average difference WLGdif2 from the white and black difference data WBdif of the target pixel TPX for each color, and replaces the white and black difference data WBdif of the target pixel TPX for each color with a resultant value of the subtraction for each color. After completing the process in RB4, the CPU 40 ends the reading defective pixel replacement process executed in RA8 of FIG. 10.

(Reference Data Calculation Process)

Figure 12:
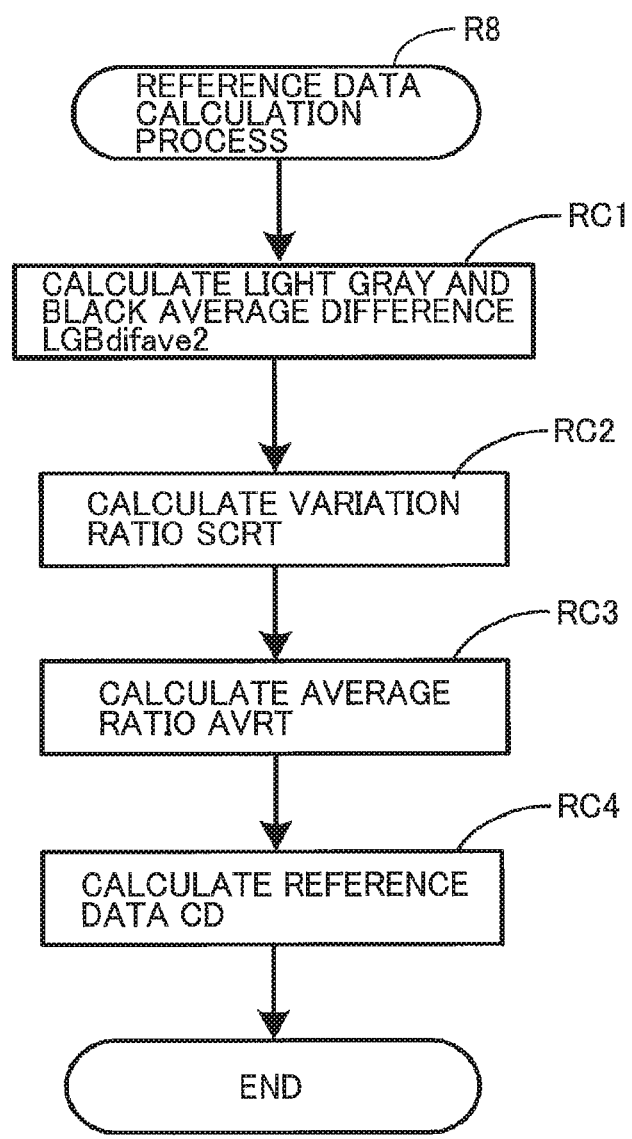
FIG. 12 is a flowchart illustrating steps in a reference data calculation process executed in the main reading process illustrated in FIG. 9.

The reference data calculation process executed in R8 of the main reading process illustrated in FIG. 9 will be described in detail with reference to FIG. 12. When the reference data calculation process is started, in RC1 the CPU 40 calculates a light gray and black average difference LGBdifave2. More specifically, the CPU 40 calculates the light gray and black average difference LGBdifave2 by averaging the light gray and black difference data LGBdif2 of all pixels in one line for each color. The CPU 40 stores the light gray and black average difference LGHdifave2 in the flash PROM 43.

In RC2 the CPU 40 calculates a variable ratio SCRT. More specifically, the CPU 40 divides the light gray and black difference data LGBdif1, which is acquired in the process of M15 in the main maintenance process illustrated in FIG. 5, of each pixel in one line for each color by the light gray and black difference data LGBdif2, which is acquired in the process of R6 in the main reading process illustrated in FIG. 9, of the corresponding pixel for the corresponding color to calculate one line worth of the variable ratio SCRT of each pixel for each color.

In RC3 the CPU 40 calculates an average ratio AVRT. More specifically, the CPU 40 divides the light gray and black average difference LGBdifave2 acquired in the process of RC1 by the light gray and black average difference LGBdifave1 acquired in the process of M19 in the main maintenance process illustrated in FIG. 5 to calculate the average ratio AVRT.

In RC4 the CPU 40 calculates reference data CD. More specifically, the CPU 40 multiplies the white and black difference data WBdif, which is stored in the process of M20 in the main maintenance process illustrated in FIG. 5, of each pixel in one line for each color by the variable ratio SCRT of the corresponding pixel for the corresponding color to calculate one line worth of the reference data CD of each pixel for each color. After completing the process in RC4, the CPU 40 ends the reference data calculation process executed in R8 of FIG. 9.

EXAMPLE

Figure 13:
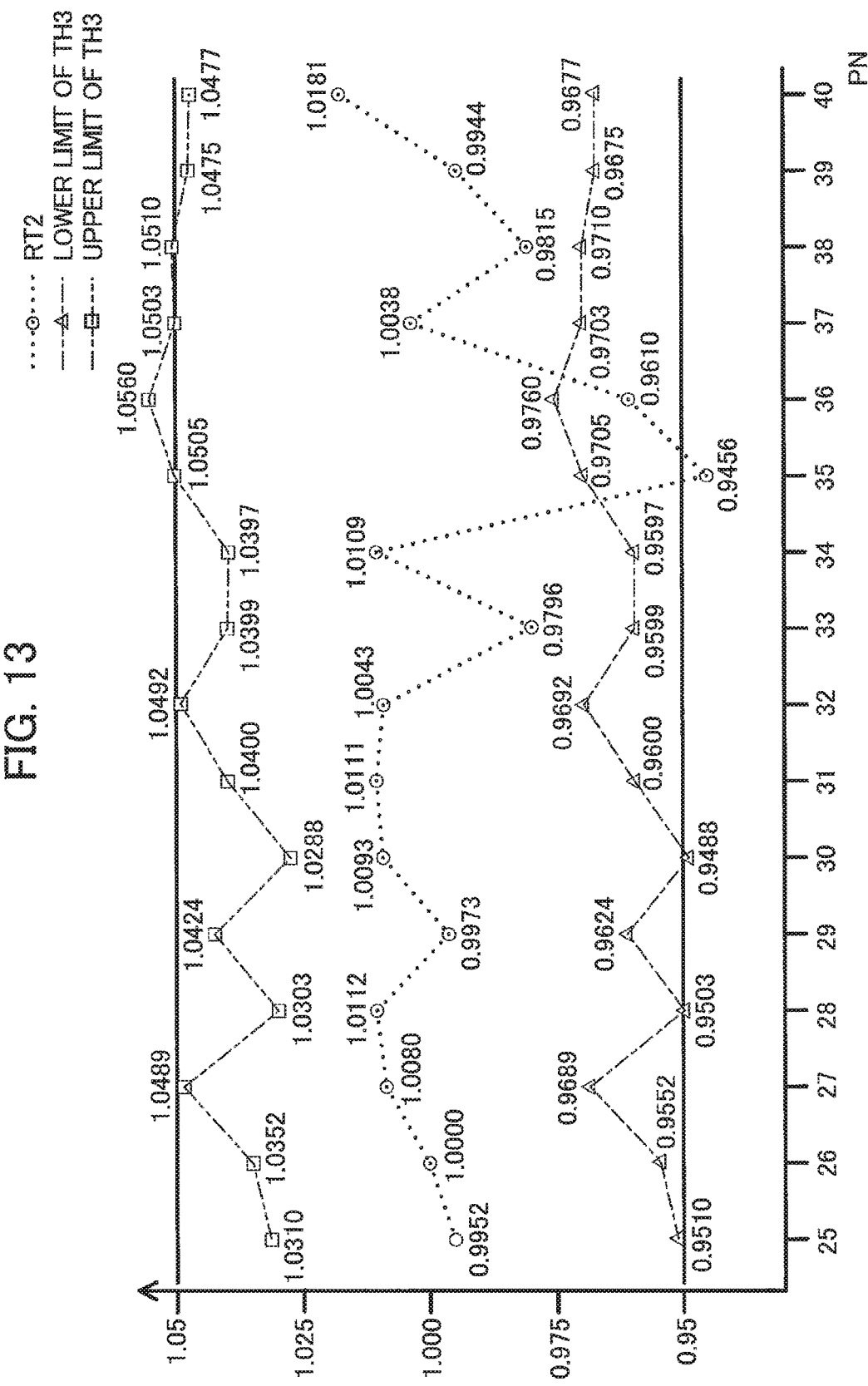
FIG. 13 is an explanatory diagram illustrating evaluation data and threshold ranges of pixels from the 25th pixel to the 40th pixel.

Next, a calculation process of the threshold range TH3 and a determination result of the evaluation data for pixels from the 25th pixel to the 40th pixel will be described while referring to FIG. 13. The pixels from the 25th pixel to the 40th pixel correspond to pixels having pixel numbers PN from 25 to 40. In FIG. 13, the evaluation data RT2 is indicated by circles with a dotted line, a lower limit of the threshold range TH3 is indicated by triangles with an alternate long and short dash line, and an upper limit of the threshold range TH3 is indicated by squares with an alternate long and two short dashes line. The scale of the horizontal axis indicates the pixel number PN in FIG. 13. In a comparative example which is different from the present embodiment, fixed evaluation values are used for determination of defective pixels. The fixed evaluation values used in the comparative example are 0.95 and 1.05, which are obtained by adding a predetermined margin to 1.00, that is a normal value of the evaluation data, and are indicated by solid lines in FIG. 13. Regarding a smaller evaluation value, which is 0.95 in the comparative example, as a lower limit, and a greater evaluation value, which is 1.05 in the comparative example, as an upper limit, a fixed evaluation range having the upper limit and the lower limit is defined.

Figure 10:
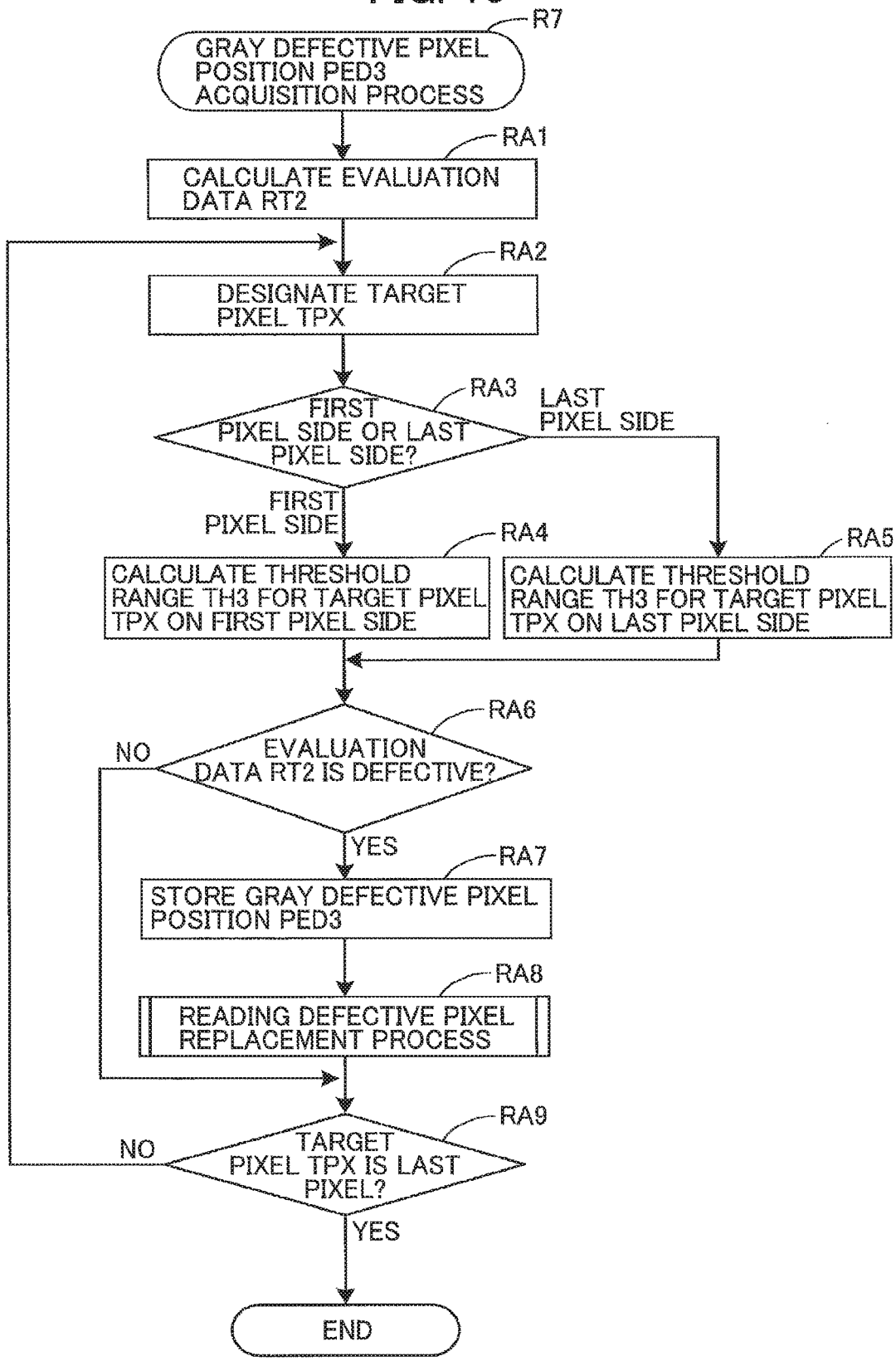
FIG. 10 is a flowchart illustrating steps in a gray defective pixel position acquisition process executed in the main reading process illustrated in FIG. 9.
Figure 11:
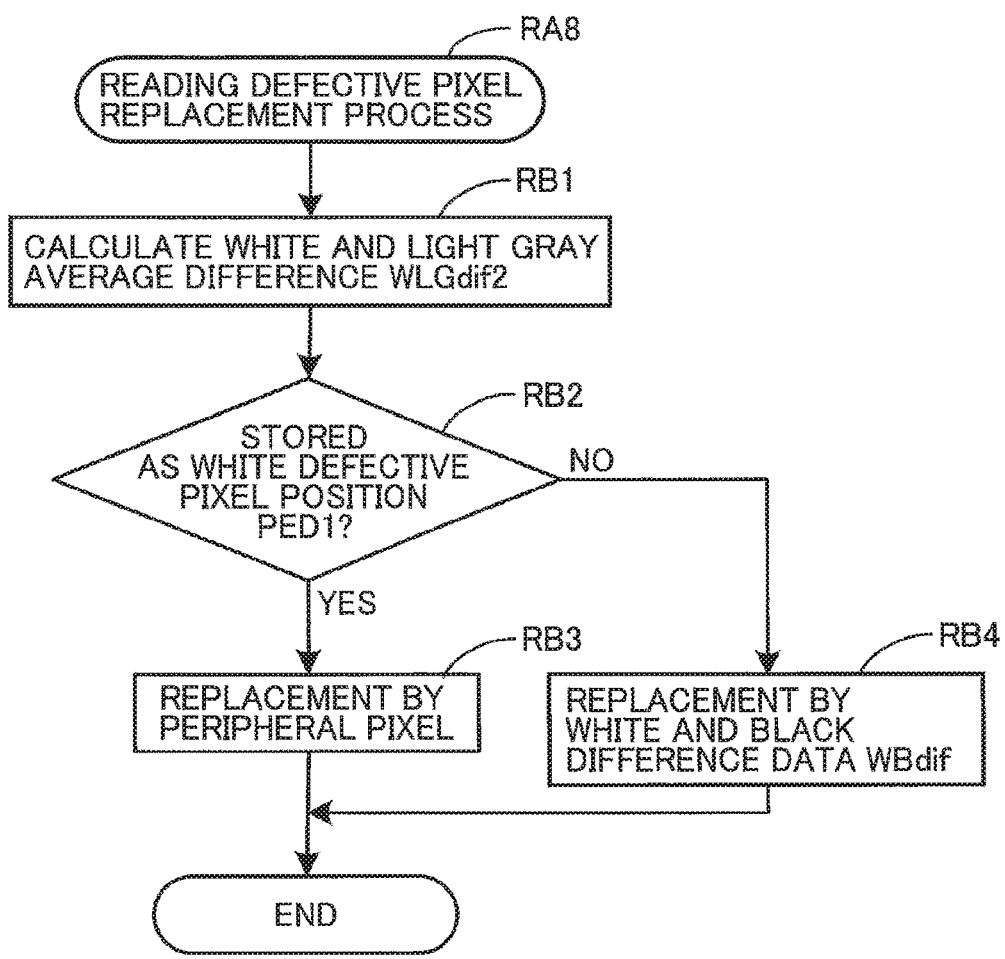
FIG. 11 is a flowchart illustrating steps in a reading defective pixel replacement process executed in the gray defective pixel position acquisition process illustrated in FIG. 10.

In the process of RA1 of the gray defective pixel position PED3 acquisition process illustrated in FIG. 10, the evaluation data RT2 are calculated for the pixels from the 25th pixel to the 55th pixel. In FIG. 13, the evaluation data RT2 for the pixels from the 25th pixel to the 40th pixel are 0.9952, 1.0000, 1.0080, 1.0112, 0.9973, 1.0093, 1.0111, 1.0043, 0.9796, 1.0109, 0.9456, 0.9610, 1.0038, 0.9815, 0.9944, and 1.0181, respectively, as indicated by the circles with the dotted line. Although not shown, the evaluation data RT2 for the pixels from the 41th pixel to the 55th pixel are 1.0134, 1.0187, 1.0099, 1.0020, 1.0027, 1.0255, 1.0052, 1.0082, 1.0026, 1.0107, 1.0090, 1.0069, 1.0149, 1.0179, and 1.0098, respectively, and are used for calculating the threshold range TH3.

In the process of RA2, each pixel is sequentially designated as the target pixel TPX. In FIG. 13, assume that the pixels from the 25th pixel to the 40th pixel are sequentially designated as the target pixel TPX. In the process of TA3, the determination is made as to whether the target pixel TPX is located on the first pixel side or the last pixel side in the chip CH. Since remainders resulting from dividing the pixel numbers PN of pixels from the 25th pixel to the 40th pixel by 216 are smaller than 108, in the process of RA3 each of the target pixels TPX is determined to be located on the first pixel side.

In the process of RA4, the threshold range TH3 for the pixel located on the first pixel side is calculated. When the target pixel TPX is the 25th pixel, in the process of RA4, the gray average GAV2 is calculated to be 0.9910 by averaging 1.0093, 0.9456, and 1.0181 which are the evaluation data RT2 of the 30th pixel, the 35th pixel, and the 40th pixel, respectively. In the process of RA4, the upper limit is calculated to be 1.0310 by adding 0.04 to the gray average GAV2, the lower limit is calculated to be 0.9510 by subtracting 0.04 from the gray average GAV2, and the threshold range TH3 is set as a range having the upper limit and the lower limit. Similarly, in the process of RA4, the threshold ranges TH3 for the pixels from the 26th pixel to the 40th pixel are set. The upper limits of the threshold ranges TH3 for the pixels from the 26th pixel to the 40th pixel are 1.0352, 1.0489, 1.0303, 1.0424, 1.0288, 1.0400, 1.0492, 1.0399, 1.0397, 1.0505, 1.0560, 1.0503, 1.0510, 1.0475, and 1.0477, respectively, as indicated by the squares with the alternate long and two short dashes line in FIG. 13. The lower limits of the threshold ranges TH3 for the pixels from the 26th pixel to the 40th pixel are 0.9552, 0.9689, 0.9503, 0.9624, 0.9488, 0.9600, 0.9692, 0.9599, 0.9597, 0.9705, 0.9760, 0.9703, 0.9710, 0.9675, and 0.9677, respectively, as indicated by the triangles with the alternate long and short dash line in FIG. 13.

In the process of RA6, the determination is made as to whether the evaluation data RT2 of the target pixel TPX is defective. When the target pixel TPX is the 35th pixel or the 36th pixel, in the process of RA6, the evaluation data RT2 of the target pixel TPX is determined to be defective since the evaluation data RT2 indicated by the circle with the dotted line is smaller than the lower limit of the threshold range TH3 indicated by the triangle with the alternate long and short dash line. When the target pixel TPX is any of the pixels from the 25th pixel to the 40th pixel except for the 35th pixel and the 36th pixel, in the process of RA6, the evaluation data RT2 of the target pixel TPX is determined to be normal since the evaluation data RT2 indicated by the circle with the dotted line falls within the threshold range TH3 indicated by the triangle with the alternate long and short dash line and the square with the alternate long and two short dashes line. Accordingly, when the fixed determination values are used, since the lower limit of the fixed determination range is 0.95 and the evaluation data RT2 of the 36th pixel is greater than the lower limit of the fixed determination range, the 36th pixel is determined to be normal. However, in the present embodiment, the evaluation data RT2 of the 36th pixel can be determined to be defective. As an advantage of this configuration, the light gray and black difference data LGBdif2 can be acquired with high accuracy.

Further, when the target pixel TPX is the 30th pixel, the threshold range TH3 is calculated by using the evaluation data RT2 of the 35th pixel for which the evaluation data RT2 is defective. However, since the threshold range TH3 is calculated by using the evaluation data RT2 for three pixels at intervals of five pixels from the target pixel TPX, even when the defective evaluation data RT2 is used for calculating the threshold range TH3, the influence from such defective evaluation data RT2 on the threshold range TH3 can be reduced. In this example, even when the target pixel TPX is the 30th pixel, the evaluation data RT2 for the 30th pixel can be determined to be normal. As an advantage of this configuration, the determination can be made on the evaluation data RT2 without error even when there exists the defective evaluation data RT2.

Advantageous Effect of Embodiment

In the present embodiment, in the process of M20 in the main maintenance process, the light gray and black difference data LGBdif1 and the white and black difference data WBdif are stored in the flash PROM 43. In the process of R6 in the main reading process, the light gray and black difference data LGBdif2 is calculated by subtracting the black data BK2 from the light gray data LGR2. In the process of RA1 in the gray defective pixel position PED3 acquisition process which is executed in R7 of the main reading process, the evaluation data RT2 is calculated by dividing the light gray and black difference data LGBdif2 by the light gray and black difference data LGBdif1. In the process of RA4 or RA5, the gray average GAV2 is calculated by averaging the evaluation data RT2 for three pixels at positions away from the target pixel TPX by five pixels, ten pixels, and fifteen pixels, respectively, an upper limit is obtained by adding a reading addition value to the calculated gray average GAV2, an lower limit is obtained by subtracting a reading subtraction value from the calculated gray average GAV2, and a range having the upper limit and the lower limit is set as the threshold range TH3 for the target pixel TPX. In the process of RA6, the determination is made as to whether the evaluation data RT2 of the target pixel TPX is defective by determining whether the evaluation data RT2 of the target pixel TPX falls within the threshold range TH3. In the process of RB3 or RB4 in the reading defective pixel replacement process which is executed in RA8 of the gray defective pixel position PED3 acquisition process, the light gray and black difference data LGBdif2 of the target pixel TPX which is determined to be defective is replaced with other data. In the process of R8, the reference data CD is calculated on the basis of the white and black difference data WBdif, the light gray and black difference data LGBdif1, and the light gray and black difference data LGBdif2. Accordingly, since the threshold range TH3 is calculated by using the evaluation data RT2 at intervals of five pixels which correspond to the intervals of lens irregularities, the determination can be made as to whether a pixel is affected by a foreign matter with the exception of an influence from lens irregularities. Consequently, the reference data CD can be calculated with high accuracy.

In the present embodiment, in the process of MA3 or MA4 in the main maintenance process, the white average WAV is calculated by averaging the white and black difference data WBdif for three pixels at positions away from the target pixel TPX five pixels, ten pixels, and fifteen pixels, respectively, an upper limit is obtained by adding a white addition value to the calculated white average WAV, an lower limit is obtained by subtracting a white subtraction value from the calculated white average WAV, and a range from the lower limit to the upper limit is derived as the threshold range TH1 for the target pixel TPX. In the process of MA5, the determination is made as to whether the white and black difference data WBdif of the target pixel TPX is defective by determining whether the white and black difference WBdif of the target pixel TPX falls within the threshold range TH1. In the process of MA6, then the white and black difference data WBdif of the target pixel TPX is defective, the position of the target pixel TPX is stored as the white defective pixel position PED1 in the flash PROM 43. In the process of RB2 in the reading defective pixel replacement process which is executed in RA8 of the main reading process, when the evaluation data RT2 of the target pixel TPX is determined to be defective, the determination is made as to whether the pixel number PN of the target pixel TPX is stored as the white defective pixel position PED1. When the pixel number PN is stored as the white defective pixel position PED1, the process of RB3 is executed, and when the pixel number PN is not stored as the white defective pixel position PED1, the process of RB4 is executed. In the process of RB3, the light gray and black difference data LGBdif2 of the target pixel TPX is replaced with the light gray and black difference data LGBdif2 of a peripheral pixel that is a different pixel from the target pixel TPX but adjacent to or around the target pixel TPX. In the process of RB4, the light gray and black difference data LGBdif2 of the target pixel TPX is replaced with a value obtained by subtracting the white and light gray average difference WLGdif2 from the white and black difference data WBdif of the target pixel TPX. Accordingly, when the light gray and black difference data LGBdif2 of the target pixel TPX is determined to be defective and the pixel number PN of the target pixel TPX is stored as the white defective pixel position PED1, the light gray and black difference data of the target pixel TPX is replaced with data of a peripheral pixel that is different pixel from the target pixel TPX but adjacent to or around the target pixel TPX. When the pixel umber PN of the target pixel TPX is not stored as the white defective pixel position PED1, the light gray and black difference data LGBdif2 of the target pixel TPX is replaced with a value obtained by subtracting the white and light gray average difference WLGdif2 from the white and black difference data WBdif of the target pixel TPX. With such replacement, when a pixel is determined to be defective, the light gray and black difference data of the defective pixel can be replaced with the light gray and black difference data LGBdif2 which is close to a value when the pixel is not defective.

[Correspondence Relationship]

The image reading device 1 is an example of the claimed image reading device, and the gray reference plate 34 is an example of the claimed reference member. The reading unit 24 and the AFE 45 are examples of the claimed reader. The light source 30 is an example of the claimed light source. The photoelectric conversion elements are examples of the claimed light receiving elements. The rod lens array 32 is an example of the claimed lens array. The flash PROM 43 is an example of the claimed memory. The CPU 40 and the image processing unit 46 is an example of the claimed controller.

The process of M14 and the process of M15 are examples of the claimed reading the evenly colored surface of the reference member in the first process. The process of R5 and the process of R6 are examples of the claimed reading the evenly colored surface of the reference member in the second process. The process of RA1 is an example of the claimed calculating evaluation data in the second process.

The process of RA2 and the process of RA9 are examples of the claimed designating a first target light receiving element. The process of RA4 or the process of RA5 is an example of the claimed calculating average evaluation data and the claimed setting an evaluation range. The process of RA6, the process of RB3, and the process of RB4 are examples of the claimed determining and the claimed revising. The process of RC2, the process of RC3, and the process of RC$ is an example of the claimed generating correction data. The process of R9 is an example of the claimed correcting.

The process of M4 and the process of M6 are examples of the claimed reading a white reference sheet. The process of MA1 and the process of MA7 are examples of the claimed designating a second target light receiving element. The process of MA3 or the process of MA4 is an example of the claimed calculating average white reference data and the claimed setting a white evaluation range. The process of MA5 and the process of MA6 the claimed determining and the claimed storing a position of the designated second target light receiving element. The process of RB1 is an example of the claimed calculating difference values.

(Modification)

While the description has been made in detail with reference to specific embodiment, it would be apparent to those skilled in the art that various changes and modifications may be made thereto. Hereinafter, modification examples will be described.

(1) The image reading device 1 according to the present embodiment may be applied to a multi-function peripheral including a printer unit. The present embodiment is configured to include one reading unit 24 and one gray reference plate 34. Alternatively, two reading units and two gray reference plates can be provided to read both surfaces of the original sheet GS.

(2) In the configuration of the present embodiment, the CPU 40 executes all the processes included in the main maintenance process illustrated in FIG. 5 and the main reading process illustrated in FIG. 9. However, the present disclosure is not limited to the above configuration. For example, part of the processes from M3 to M7 and from M11 to M20 in the main maintenance process and part of the processes from R2 to R8 in the main reading process may be executed by the image processing unit 46, the device control unit 44, or the AFE 45. An external device which is independent of the image reading device 1, such as a computer, for example, may also execute the main maintenance process.

(3) In the present embodiment, a white reference plate or a black reference plate may be provided in place of the gray reference plate 34. In particular, when the white reference plate is provided, the light gray and black difference data LGBdif2 may be used as the reference data CD, instead of generating the reference data CD by multiplying the white and black difference data WBdif by the variable ratio SCRT and the average ratio AVRT.

(4) In the present embodiment, the main maintenance process illustrated in FIG. 5 and the main reading process illustrated in FIG. 9 is described when the color mode is selected. Alternatively, the processes may be executed in the mono mode. In the color mode, one line is constituted with three colors, whereas, in the mono mode, one line is constituted with one color.

(5) In the configuration of the present embodiment, the reading unit 24 can perform reading with a resolution of 300 DPI. Alternatively, the resolution may be 600 DPI or 1200 DPI. In such a case, a pixel interval in which lens irregularities are generated is 10 pixels for 600 DPI and 20 pixels for 1200 DPI.

(6) In the present embodiment, the distance of each interval between two adjacent lenses included in the rod lens array 32 is 0.4 mm. Alternatively, the interval may be 1.0 mm. In such a case, a pixel interval in which lens irregularities are generated becomes 12 pixels.

Figure 8:
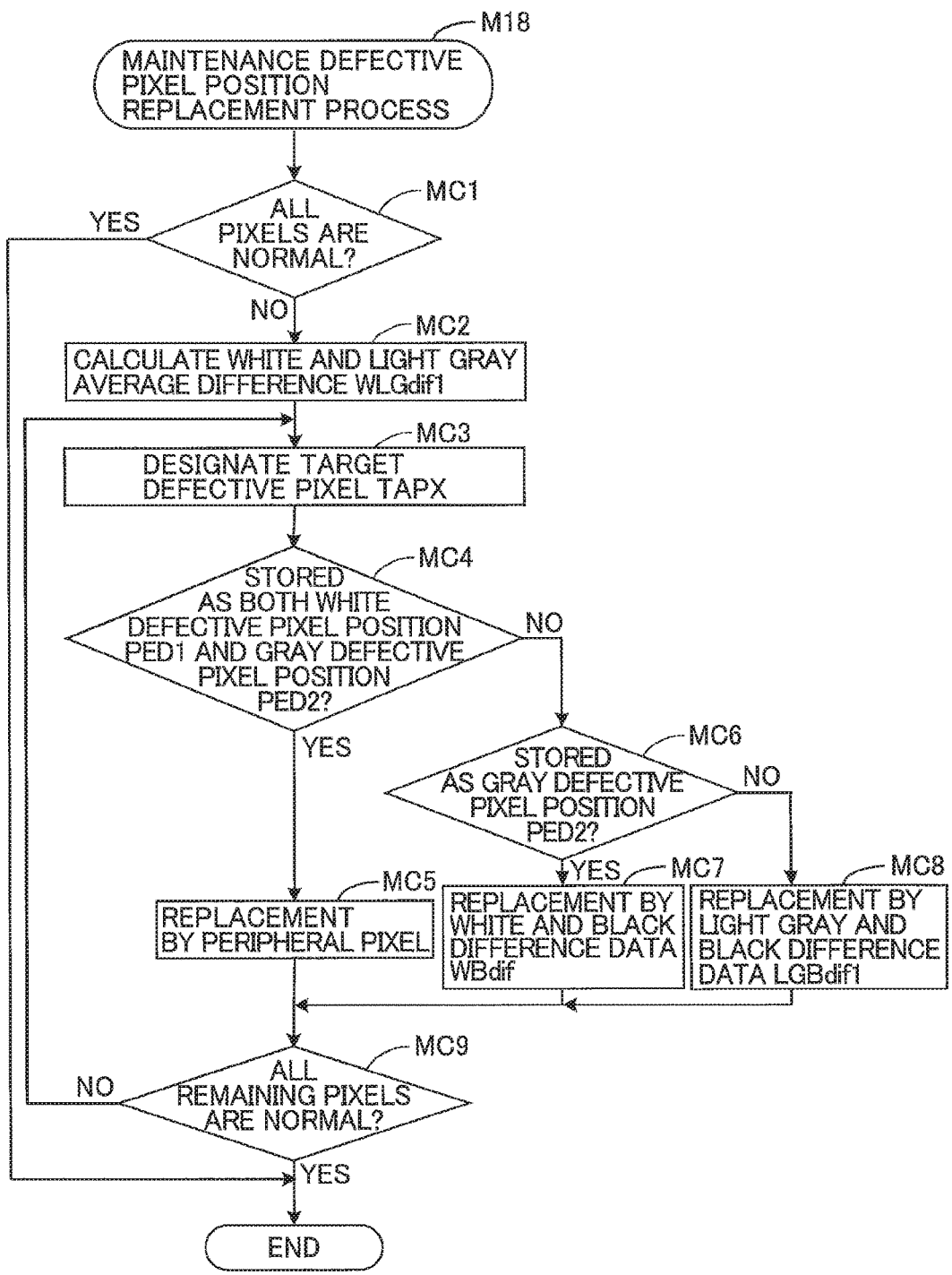
FIG. 8 is a flowchart illustrating steps in a maintenance defective pixel position replacement process executed in the main maintenance process illustrated in FIG. 5.

(7) In the present embodiment, the determination is made by using the gray defective pixel position PED2 in the process of MC6 in the maintenance defective pixel replacement process illustrated in FIG. 8. Alternatively, the determination may be made by using the white defective pixel position PED1. The determination as to the gray defective pixel position PED2 is made by using the evaluation data RT1, whereas the determination as to the white defective pixel position PED1 is made by using the white and black difference data WBdif. Lens irregularities are generated in the white and black difference data WBdif, whereas no lens irregularities are generated in the evaluation data RT1. For this reason, detection accuracy becomes high at the gray defective pixel position PED2 for which the determination is made by using the evaluation data RT1, and the number of pieces of data of the gray defective pixel position PED2 becomes small. The determination can be made promptly in the process of MC6.

What is claimed is:

1. An image reading device comprising:
  a reader comprising:
    a light source configured to emit light;
    a plurality of light receiving elements arranged at an equi-interval on a line extending in a predetermined direction and consecutively arranged from a first light receiving element to a last light receiving element in the predetermined direction; and
    a lens array having a plurality of lenses arranged at an equi-interval on another line extending in the predetermined direction, the lens array being configured to direct light onto the plurality of light receiving elements, the plurality of light receiving elements outputting one line worth of data for setting values of a plurality of pixels, an interval between two adjacent lenses being equal to a length of an array of a first number of consecutively arranged light receiving elements;
  a reference member having an evenly colored surface; and
  a controller configured to perform:
    executing a first process including reading the evenly colored surface of the reference member by the reader to acquire one line worth of first reference data from the plurality of light receiving elements; and
    executing a second process after execution of the first process, the second process including:
      reading the evenly colored surface of the reference member by the reader to acquire one line worth of second reference data from the plurality of light receiving elements;
      calculating evaluation data with respect to each of the plurality of light receiving elements, the evaluation data being a ratio between the first reference data and the second reference data;
      designating a first target light receiving element from the plurality of light receiving elements one by one sequentially;
      calculating, each time the first target light receiving element is designated, average evaluation data by averaging the evaluation data of a second number of light receiving elements located at positions apart every predetermined distance equal to the length of the array of the first number of consecutively arranged light receiving elements, the second number of light receiving elements subject to an average evaluation data calculation being positionally associated with the designated first target light receiving element;

setting an evaluation range of the designated first target light receiving element to have an upper limit and a lower limit, the upper limit of the evaluation range being set by adding a first value to the average evaluation data, the lower limit of the evaluation range being set by subtracting the first value from the average evaluation data;

determining whether the evaluation data of the designated first target light receiving element falls within the evaluation range of the designated first target light receiving element;

in response to determining that the evaluation data of the designated first target light receiving element is out of the evaluation range of the designated first target light receiving element, revising the second reference data of the designated first target light receiving element; and generating correction data for applying to an output from the designated first target light receiving element using the second reference data of the designated first target light receiving element after revision.

2. The image reading device according to claim 1, wherein the light source is configured to emit light toward an object, and the lens array is configured to receive light bearing an object image and form one line worth of the object image onto the plurality of light receiving elements, one line worth of object image data being outputted from the plurality of light receiving elements, and
wherein the controller is configured to further perform executing a third process including correcting the one line worth of the object image data using the correction data.

3. The image reading device according to claim 1, wherein the second process further includes in response to determining that the evaluation data of the designated first target light receiving element falls within the evaluation range of the designated first target light receiving element, the second reference data of the designated first target light receiving element remain unrevised.

4. The image reading device according to claim 1, wherein the plurality of light receiving elements comprises a plurality of groups of light receiving elements, each of the plurality of groups of light receiving elements including an even number of light receiving elements, one half of the even number of light receiving elements being located in positions nearer to the first light receiving element than the last light receiving element, another half of the even number of light receiving elements being located in positions nearer to the last light receiving element than the first light receiving element, and
wherein the average evaluation data is calculated by averaging evaluation data of the second number of light receiving elements located at positions apart every predetermined distance equal to the length of the array of the first number of light receiving elements consecutively arranged in the predetermined direction for the first light receiving element designated from the one half of the even number of light receiving elements, whereas the average evaluation data is calculated by averaging evaluation data of the second number of light receiving elements located at positions apart every predetermined distance equal to the length of the array of the first number of light receiving elements consecutively arranged in a direction opposite the predetermined direction for the first light receiving element designated from the another half of the even number of light receiving elements.

5. The image reading device according to claim 4, wherein the second number is three.

6. The image reading device according to claim 1, wherein the evenly colored surface of the reference member has a color other than white.

7. The image reading device according to claim 6, further comprising a memory,
wherein the first process further includes:
reading a white reference sheet by the reader to acquire one line worth of white reference data from the plurality of light receiving elements;
designating a second target light receiving element from the plurality of light receiving elements one by one sequentially;
calculating, each time the second target light receiving element is designated, average white reference data by averaging the white reference data of the second number of light receiving elements located at positions apart every predetermined distance equal to the length of the array of the first number of consecutively arranged light receiving elements, the second number of light receiving elements subject to an average white reference data calculation being positionally associated with the designated second target light receiving element;
setting a white evaluation range of the designated second target light receiving element to have an upper limit and a lower limit, the upper limit of the white evaluation range being set by adding a second value to the average white reference data, the lower limit of the white evaluation range being set by subtracting the second value from the average shite reference data;
determining whether the white reference data of the second target light receiving element falls within the white evaluation range of the designated second target light receiving element; and
in response to determining that the white reference data of the designated second target light receiving element is out of the white evaluation range of the second target light receiving element, storing a position of the designated second target light receiving element as a white defective position in the memory,
wherein the second process further includes:
in response to determining that the evaluation data of the first target light receiving element is out of the evaluation range of the designated first target light receiving element, determining whether a position of the designated first target light receiving element is stored as the white defective position in the memory,
wherein in response to determining that the position of the designated first target light receiving element is stored as the white defective position, the revising replaces the second reference data of the designated first target light receiving element with the second reference data of a light receiving element adjacent the designated first target light receiving element, wherein in response to determining that the position of the designated first target light receiving element is not stored as the white defective position, the revising replaces the second reference data of the designated first target light receiving element with the white reference data of the first target light receiving element, and wherein the generating divides the white reference data of the first target light receiving element by the first reference data of the first target light receiving element to obtain a variable ratio of the designated first target light receiving elment and multiplies the variable ratio of the designated first target light receiving element by the second reference data of the designated first target light receiving element after revision to obtain the correction data of the designated first target light receiving element.

8. The image reading device according to claim 7, wherein the second process further includes:

calculating difference values of the plurality of light receiving elements by subtracting the second reference data of each of the plurality of light receiving elements from the white reference data of the corresponding light receiving element and calculating an average white difference by averaging the difference of the plurality of light receiving elements, wherein in response to determining that the position of the designated first target light receiving element is not stored as the white defective position, the revising replaces the second reference data of the designated first target light receiving element with a value obtained by subtracting the average white difference from the white reference data of the designated first target light receiving element.

9. The image reading device according to claim 1, wherein the evenly colored surface of the reference member has a lower reflectivity than white, wherein the first reference data is acquired by reading the evenly colored surface of the reference member while emitting light with a maximum intensity of light from the light source to acquire first light gray data, reading the evenly colored surface of the reference member while turning off the light source to acquire first black data, and subtracting the first black data from the first light gray data, and wherein the second reference data is acquired by reading the evenly colored surface of the reference member while emitting light with the maximum intensity of light from the light source to acquire second light gray data, reading the evenly colored surface of the reference member while turning off the light source to acquire second black data, and subtracting the second black data from the second light gray data.

10. An image reading device comprising:

a reader comprising:

a light source configured to emit light toward an object;

a plurality of light receiving elements arranged at an equi-interval on a line extending in a predetermined direction and consecutively arranged from a first light receiving element to a last light receiving element in the predetermined direction; and a lens array having a plurality of lenses arranged at an equi-interval on another line extending in the predetermined direction, the lens array being configured to receive light bearing an object image and form one line worth of the object image onto the plurality of light receiving elements, one line worth of object image data being outputted from the plurality of light receiving elements for setting values of a plurality of pixels, an interval between two adjacent lenses being equal to a length of an array of a prescribed number of consecutively arranged light receiving elements;

a reference member having an evenly colored surface;

a memory storing one line worth of first reference data obtained from the plurality of light receiving elements; and a controller configured to perform:

reading the evenly colored surface of the reference member by the reader to acquire one line worth of second reference data from the plurality of light receiving elements;

calculating evaluation data with respect to each of the plurality of light receiving elements, the evaluation data being a ratio between the first reference data and the second reference data;

designating a target light receiving element from the plurality of light receiving elements one by one sequentially;

calculating, each time the target light receiving element is designated, average evaluation data by averaging the evaluation data of a second number of light receiving elements located at positions apart every predetermined distance equal to the length of the array of the first number of consecutively arranged light receiving elements, the second number of light receiving elements subject to an average evaluation data calculation being positionally associated with the designated target light receiving element;

setting an evaluation range of the designated target light receiving element to have an upper limit and a lower limit, the upper limit of the evaluation range being set by adding a predetermined value to the average evaluation data, the lower limit of the evaluation range being set by subtracting the predetermined value from the average evaluation data;

determining whether the evaluation data of the designated target light receiving element falls within the evaluation range of the designated target light receiving element;

in response to determining that the evaluation data of the designated target light receiving element is out of the evaluation range of the designated target light receiving element, revising the second reference data of the designated target light receiving element;

generating correction data for applying to an output from the designated target light receiving element using the second reference data of the designated target light receiving element after revision; and correcting the one line worth of the object image data using the correction data after revision.

* * * * *